United States Patent [19]
Nishio et al.

[11] Patent Number: 5,714,218
[45] Date of Patent: Feb. 3, 1998

[54] IONIZING RADIATION-CURABLE RESIN COMPOSITION FOR OPTICAL ARTICLE, OPTICAL ARTICLE, AND SURFACE LIGHT SOURCE

[75] Inventors: Toshikazu Nishio; Hiroshi Kojima; Hisanori Ishida; Kazuko Etou; Hiroyuki Amemiya; Michiko Takeuchi, all of Tokyo; Eiji Ichinose, Chiba; Youichi Abe, Chiba; Hidenobu Ishikawa, Chiba, all of Japan

[73] Assignees: Dainippon Printing Co., Ltd.; Dainippon Ink and Chemicals, Inc., both of Tokyo, Japan

[21] Appl. No.: 517,526

[22] Filed: Aug. 21, 1995

[51] Int. Cl.$^6$ ...................................................... B32B 3/00
[52] U.S. Cl. .................... 428/64.1; 428/64.4; 428/523; 526/328; 526/329.7
[58] Field of Search .................. 526/328, 329.7; 428/523, 64.1, 64.4

[56] References Cited

U.S. PATENT DOCUMENTS 5,292,471  3/1994  Ito et al. .................................. 264/171

FOREIGN PATENT DOCUMENTS 0 490 704 A2  6/1992  European Pat. Off. .
0 631 859 A2  1/1995  European Pat. Off. .

*Primary Examiner*—Elizabeth Evans
*Attorney, Agent, or Firm*—Armstrong, Westerman, Hattori, McLeland & Naughton

[57] ABSTRACT

An ionizing radiation-curable resin composition which provides a cured product having no yield point in the stress-strain diagram in tension is disclosed. An optical article prepared from the ionizing radiation-curable resin composition and a surface light source using the optical article are also disclosed. The present invention provides an excellent ionizing radiation-curable resin composition, an excellent optical article comprising a cured product of the resin composition, and an excellent surface light source using the optical article, which have high surface hardness and a high refractive index and are free from deformation, permanent sets, and reduction in weather resistance after curing.

8 Claims, 7 Drawing Sheets

IONIZING RADIATION-CURABLE RESIN COMPOSITION FOR OPTICAL ARTICLE, OPTICAL ARTICLE, AND SURFACE LIGHT SOURCE

FIELD OF THE INVENTION

The present invention relates to an ionizing radiation-curable resin composition for an optical article, an optical article having excellent performance properties which is prepared from the ionizing radiation-curable resin composition, and a surface light source using the optical article. The resin composition of the present invention is cured without being accompanied with shrinkage deformation and provides a cured product which has high surface hardness and suffers from no problem, such as deformation after curing, a permanent set, and reduction in weather resistance, and is therefore useful as a lighting means for a back light of light transmission displays, such as transmission liquid crystal display elements, video projectors, advertizing signs, light diffusing plates, and retroreflective lenses, or as an optical article, such as a hologram or a projection screen.

BACKGROUND OF THE INVENTION

In recent years, the demands for reductions in weight and power consumption of transmission liquid crystal displays (hereinafter abbreviated as LCD) have ever been increasing. Various proposals have been made to date, aiming at effective utilization of light energy of a back light, that is, uniform and effective collection of light from the light source to the necessary and sufficient direction and angle of diffusion.

Conventional light collecting elements usually comprise a light transmitting plate comprising a transparent acrylic resin, etc. and a light source set by the side of the plate. The light entering the light transmitting plate from its side edge is reflected on a reflecting layer provided on the back side of the light transmitting plate and then emitted from the light emitting side (upper side) of the light transmitting plate.

In order to endow the output light with desired angle of diffusion, light emission direction, and peak direction luminance, an optical article having a prism action or a lens action, i.e., a lens array sheet is provided on the upper side of the light transmitting plate to form a surface light source. Such a surface light source having a light source by the side of a light transmitting plate is called an edge light (or side light) type surface light source from its structure. A vertical type surface light source in which a light source is provided right under a diffusing sheet or a lens array sheet is also available but is limited in use because it is bulky for use as a surface light source for LCD.

Lens array sheets have generally been produced by injection molding or hot pressing of thermoplastic resins as disclosed in U.S. Pat. Nos. 2,482,598 and 3,565,978. However, these methods require a long time for heating and cooling and have low productivity. Further, the resulting lens array sheet has insufficient durability.

A process for producing a replica of a lens master mold has recently been proposed, comprising curing a reactive resin interposed between a lens master and a transparent film by application of heat or ultraviolet light. For example, U.S. Pat. No. 2,524,862 discloses a process for producing an optical article comprising photopolymerization of a composition containing a monomer, e.g., (meth)acrylic acid or methyl methacrylate, or a partial polymer thereof.

U.S. Pat. Nos. 3,689,346 and 3,935,359 disclose a process for continuously producing a lens array sheet comprising casting a resin composition containing a crosslinkable, partially polymerized acrylic ester, etc. into a lens master and solidifying the resin composition by ionizing radiation or heat.

JP-A-48-21546 (the term "JP-A" as used herein means an "unexamined published Japanese patent application") discloses a process for producing an optical element comprising sandwiching a solventless photocuring resin between a pair of transparent holders, exposing the resin to light from the transparent part to cure the exposed area to obtain a photo-setting resin molded article having a shape corresponding to the contact surface of the holders.

U.S. Pat. No. 4,376,800 describes a process for producing an optical article comprising ultraviolet curing of a composition of an acrylic monomer and urethane acrylate. However, the process involves use of skin-irritating or toxic monomers, which deteriorates the working environment, and takes time to complete the reaction, resulting in poor productivity. Further, the resulting cured product has poor mechanical properties or suffers deformation due to shrinkage on curing, such as curl of a film.

JP-B-62-51725 (the term "JP-B" as used herein means an "examined Japanese patent publication") discloses a process for reproducing a plastic information carrier, such as CD or LD, comprising coating a metallic die (master mold) having information tracks with a radiation-polymerizable resin having a saturated hydrocarbon group or a phenyl group and superposing a substrate on the polymerizable resin or previously coating the substrate with the polymerizable resin and bringing the polymerizable resin layer into contact with the die, photocuring the polymerizable resin, and releasing the substrate integrated with the cured resin layer from the die.

U.S. Pat. No. 3,689,346 and JP-A-5-169015 disclose a process for producing a sheet of fine lens array comprising filling a mold having an engraved pattern of a desired lens array with an ionizing radiation-curable resin composition, irradiating the resin composition with an ionizing radiation such as ultraviolet light or an electron beam to crosslink the oligomer composition to cure, and removing the cured product from the mold.

U.S. Pat. No. 4,576,850 and JP-B-4-5681 disclose a method for obtaining a cured product having improved thermal dimensional stability and improved mechanical properties by crosslink-curing a mixture of a compound called a soft segment and a compound called a hard segment by ultraviolet irradiation. However, according to this method, curing needs a relatively long time, and the introduction of a soft segment leaves such problems as a reduction in surface hardness of a cured product, deformation of a lens array sheet on curing, and reduction in weather resistance.

JP-A-4-329501 discloses a fine lens array similarly produced by casting of an ionizing radiation-curable resin, in which the lens array comprises an ionizing radiation-cured product of a polyfunctional (meth)acrylate, the cured product having a Young's modulus of 1000 to 5000 kg/cm$^2$. According to the disclosure, if the Young's modulus is less than 1000 kg/cm$^2$, the lens array is liable to deformation when piled up, the shape of the resulting optical article, particularly the shape of the apexes on which a load is imposed tends to be distorted to change the optical characteristics. If it exceeds 5000 kg/cm$^2$, the cured product tends to undergo warpage due to polymerization shrinkage.

For the same reason, JP-A-6-67004 also mentions that a cured product of an ionizing radiation-curable resin preferably has a tensile modulus of 10000 to 50000 kg/cm$^2$ at 25° C.

In practice, however, it has turned out difficult to completely eliminate the following disadvantages even with these conventional techniques for producing an optical article.

(I) Where an optical article is made of a hard resin (i.e., a resin having a high Young's modulus), the article often suffers from warpage or optical strain especially when it has a sheet form, though exhibiting satisfactory shape reproducibility and surface hardness. Once deformed by bending or indentation, the article does not recover and the deformation remains permanently, leaving a trace of deformation (a permanent set). On application of further outer force, the article is apt to be cracked or broken.

(II) Where an optical article is made of a soft resin (i.e., a resin having a low Young's modulus), although the above disadvantages are eliminated, the optical article tends to be deformed. In particular, an article having a sheet form is easily deformed when laid one on the other or when laminated on LCD, a light transmitting plate of an edge light type surface light source, or any other plate. That is, the shape of the lenses, particularly the shape of the apexes on which a load is imposed, is distorted. It follows that the optical article undergoes changes in optical characteristics or tends to be worn out or scratched due to insufficient surface hardness.

It is extremely difficult to completely prevent a permanent set. Cases are often met with in which an optical article still takes a permanent set even with all the other problems settled, or the problem of a permanent set cannot be solved without giving rise to other problems.

SUMMARY OF THE INVENTION

An object of the present invention is to eliminate the above-mentioned disadvantages (I) and (II), especially the problem of a permanent set and to provide an ionizing radiation-curable resin composition for an optical article which is cured in a reduced time, has excellent productivity, and provides a cured product excellent in transparency, refractive index and surface hardness; an optical article prepared from the ionizing radiation-curable resin composition; and a surface light source using the optical article.

As a result of extensive investigations for the purpose of achieving the above object, the present inventors have found that attention only to tensile modulus is not sufficient for settlement of the problems and that disadvantages (I) and (II), particularly the problem of a permanent set, associated with conventional ionizing radiation-curable resin compositions, can be overcome by using an ionizing radiation-curable resin composition which provides a cured product having no yield point in the stress-strain diagram in tension. In particular, they have found that a specific ionizing radiation-curable resin composition characterized by comprising (a) an epoxyacrylate having a cyclic structure and containing at least two acrylate groups and (b) a monofunctional acrylate having a cyclic structure and having a total acrylate functional group concentration of 0.2 to 5.0 mmol/g is cured at a high curing rate with little deformation, such as curl, and enables a design of fine shapes and, on curing, provides a cured product having high hardness, a high refractive index, and excellent durability. The present invention has been completed based on this finding.

The present invention relates to an ionizing radiation-curable resin composition for an optical article, wherein a cured product obtained therefrom has no yield point in the stress-strain diagram in tension.

The ionizing radiation-curable resin composition according to the present invention is preferably an ionizing radiation-curable resin composition for an optical article characterized by comprising (a) an epoxyacrylate having a cyclic structure and containing at least two acrylate groups (hereinafter simply referred to as epoxyacrylate (a)) and (b) a monofunctional acrylate having a cyclic structure (hereinafter simply referred to as monofunctional acrylate (b)) and having a total acrylate functional group concentration of 0.2 to 5.0 mmol/g.

The ionizing radiation-curable resin composition according to the present invention is particularly characterized in that epoxyacrylate (a) is an epoxyacrylate obtained by the reaction between at least one epoxy resin selected from the group consisting of a bisphenol A epoxy resin, a bisphenol F epoxy resin, a partially halogen-substituted bisphenol A epoxy resin, a partially halogen-substituted bisphenol F epoxy resin, a hydrogenated bisphenol A epoxy resin and a mixture thereof, and (meth)acrylic acid.

The ionizing radiation-curable resin composition according to the present invention is more particularly characterized in that monofunctional acrylate (b) is at least one monofunctional acrylate selected from the group consisting of isobornyl (meth)acrylate, glycidyl cyclocarbonate (meth)acrylate, tetrahydrofurfuryl (meth)acrylate, 2-hydroxy-3-phenoxypropyl (meth)acrylate, 2-phenyl-2-(4-acryloyloxyphenyl)propane, a 2-phenyl-2-(4-acryloyloxyalkoxyphenyl)propane, 2,4,6-tribromophenyl acrylate, a 2,4,6-tribromophenoxyalkyl acrylate, and a mixture thereof.

The present invention embraces an optical article comprising a cured product of the ionizing radiation-curable resin composition for an optical article according to the present invention, an optical article comprising (A) a layer of a cured product of the ionizing radiation-curable resin composition for an optical article according to the present invention and (C) a transparent resin layer having a sheet form, and an optical article comprising cured product layer (A), (B) an adhesive layer, and transparent resin layer (C).

The present invention further relates to a surface light source composed of a light conducting plate comprising a light transmitting plate, at least one light source unit adjoining one of side edges of the light conducting plate, a light reflecting layer provided on the back side of the light conducting plate, and an optical article according to the present invention which is laminated on the light emitting side of the light conducting plate.

EXPLANATION OF SYMBOLS

Figure 1:
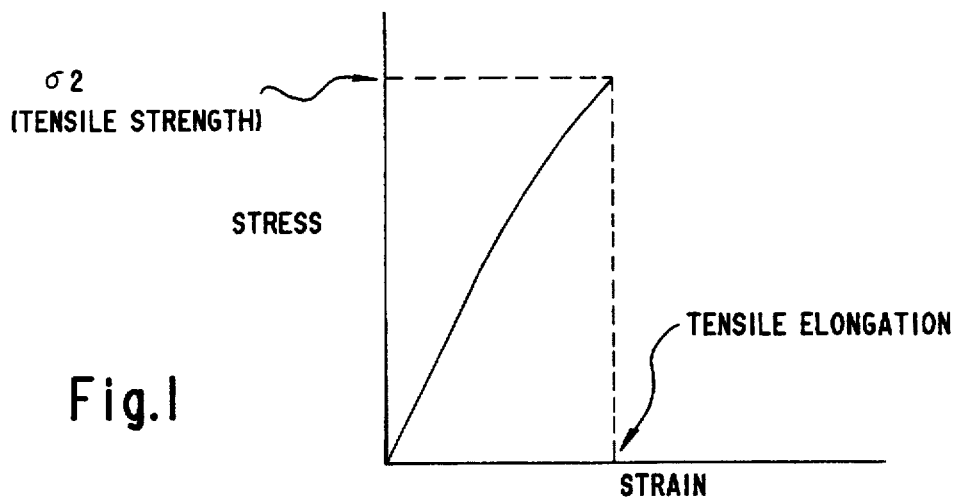
FIG. 1 is a schematic diagram showing the relationship of stress (kg/cm$^2$) vs. strain (%) in tension (stress-strain curve), in which the ordinate represents a tensile stress (kg/cm$^2$), and the abscissa strain (%). This diagram has a pattern with no yield point (pattern A).

1 . . . Intaglio printing roll
2 . . . Concavity
3 . . . Uncured ionizing radiation-curable resin composition (A)
3a . . . Cured ionizing radiation-curable resin composition (A)
4 . . . Base sheet (C)
5 . . . Press roll
6 . . . Lead-on roll
7 . . . Curing equipment
8 . . . Lead-on roll
9 . . . Lens array sheet
10 . . . T-die nozzle
11 . . . Drier
12 . . . Reservoir
P . . . Pitch
β . . . Vertical angle
41 . . . Unit lens
51 . . . Light conducting plate
52 . . . Light source
53 . . . Light reflecting layer
54 . . . Lamp housing
60 . . . Transmission liquid crystal display element
100 . . . Surface light source
200 . . . Liquid crystal device (LCD)

DETAILED DESCRIPTION OF THE INVENTION

The present invention will further be described below in greater detail.

The term "optical article" as referred to herein denotes a unidirectional or bidirectional array of fine unit lenses or prisms, such as a lenticular lens as hereinafter described. More specifically, the optical article includes light diffusing plates and light collecting plates for a back light of transmission LCD, electric decorative boards, advertizing displays, etc.; screens of projection TV sets; lenticular lenses, Fresnel lenses and retroflection sheets for light collecting lenses; diffraction gratings; holograms; and recording media having modulated grooves or pits so as to record and reproduce information utilizing changes in reflectance or transmittance of light, such as compact discs and videodiscs. Many of these optical articles have on their surface a fine structure for efficiently reflecting, refracting or collecting light.

These optical articles, such as a lens array sheet, not infrequently undergo local deformation by outer force during production or when fitted into equipment. For example, if a web of an optical article is rolled up with any foreign matter or air bubbles entrapped, a great local stress is imposed to the part where the foreign matter exists. There are cases where an optical article is stored in piles in a roll form or a cut sheet form. In these cases, too, the optical article receives a locally concentrated stress due to its own weight. Such a local stress tends to remain as a strain to cause a permanent set (what we call a trace of deformation) even after release from the stress. This seems to be because an excessive stress causes plastic deformation of the optical article.

In order to solve the above problem, the ionizing radiation-curable resin composition of the present invention is characterized in that a cured product thereof has no yield point in the stress-strain diagram in tension. The term "no yield point" as used herein means that no yield point appears on the diagram of tensile stress (kg/cm$^2$) vs. strain (%), i.e., the stress-strain curve of a cured product as in FIG. 1. A cured product whose stress-strain curve has a yield point as in FIG. 2 is unfavorable.

Figure 3:
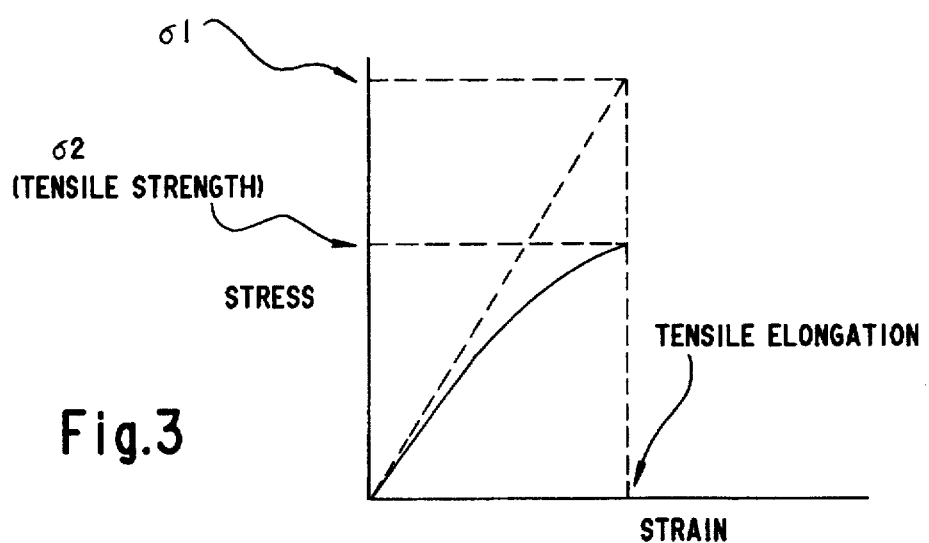
FIG. 3 is a schematic diagram showing the relationship of stress (kg/cm$^2$) vs. strain (%) in tension (stress-strain curve), in which the ordinate represents a tensile stress (kg/cm$^2$), and the abscissa strain (%). This diagram has a pattern with no yield point (pattern A).

In particular, a cured product having such a stress-strain curve as depicted in FIG. 3 is preferred, in which the ratio of the stress at rupture ($\sigma 2$) to the intersection ($\sigma 1$) between the initial tangent line and the stress at the elongation at break, $\sigma 2/\sigma 1$, is not less than 0.5. If the $\sigma 2/\sigma 1$ ratio is less than 0.5, it takes a longer time for a cured product to recover from deformation after release from outer force.

Figure 2:
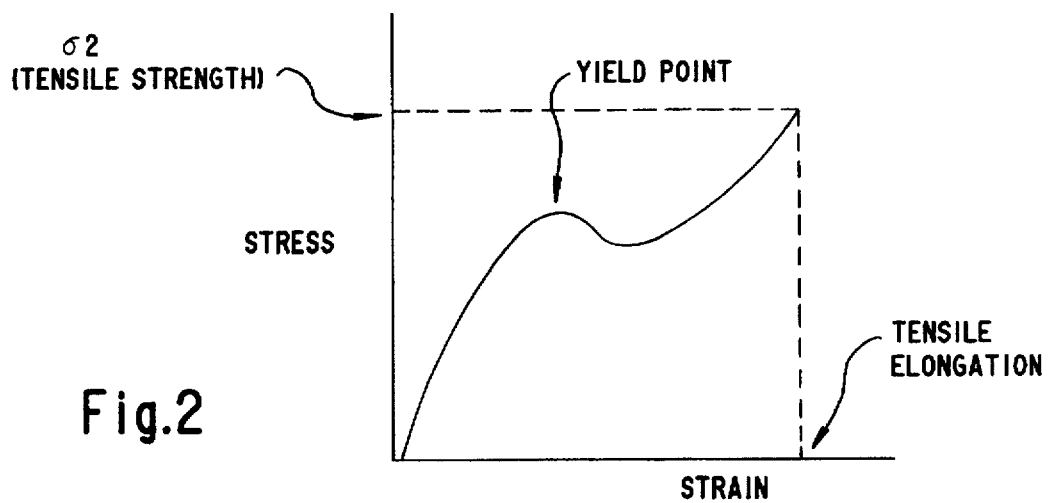
FIG. 2 is a schematic diagram showing the relationship of stress (kg/cm$^2$) vs. strain (%) in tension (stress-strain curve), in which the ordinate represents a tensile stress (kg/cm$^2$), and the abscissa strain (%). This diagram has a pattern with a yield point (pattern B).

FIGS. 1 through 3 each schematically depict the relationship between tensile stress (kg/cm$^2$) and strain (%) as measured at a temperature of 23°±2° C. and a relative humidity of 50±2% in accordance with the measuring method of JIS K7113. Strain (%) is a percentage of the difference between the length (l) of a sample after pulling and the initial length (l$_0$) of the sample based on the initial length (l$_0$) of the sample as calculated by equation:

strain (%)=(l−l$_0$)/l$_0$×100.

The problem of a permanent set cannot be completely settled down simply by tensile modulus control. Occurrence of a permanent set is related to whether or not a stress-strain curve has a yield point. A cured product having no yield point which is obtained from the ionizing radiation-curable resin composition of the present invention escapes taking a permanent set and exhibits satisfactory properties. That is, an optical article comprising a cured product of the ionizing radiation-curable resin composition of the present invention shows no yield point in its stress-strain curve. As long as a stress imposed on the optical article is within the elastic limit, the optical article restores its original shape through elastic recovery on being relieved from the stress and does not take a permanent set.

The ionizing radiation-curable resin composition for an optical article which can be used in the present invention is not particularly limited as far as a cured product thereof shows the above-mentioned behavior on its stress-strain curve and preferably satisfies the tensile modulus condition hereinafter described. Accordingly, the curable resin composition of the present invention may basically contain a resinous component called a soft segment or a hard segment described in U.S. Pat. No. 4,576,850.

An ionizing radiation-curable composition solely consisting of a soft segment is also included in the present invention. However, a particularly preferred embodiment of the present invention is a resin composition comprising a resin component called a hard segment and containing no soft segment component, which is constituted of a structurally rigid component, and a cured product of which has a high hardness and a high refractive index. Such a hard segment preferably has a cyclic structure, still preferably has a benzene or substituted benzene ring structure, and particularly preferably contains not less than 30% by weight of a benzene or substituted benzene ring structure.

With respect to elastic modulus, a cured product having too high an elastic modulus tends to undergo optical strain and cracking, and a cured product having too low an elastic modulus tends to undergo deformation when laminated. While the elastic modulus may be evaluated in terms of modulus in compression or in bending, it is preferably evaluated in terms of tensile modulus, also designated Young's modulus or longitudinal modulus.

The tensile modulus of a cured product of the ionizing radiation-curable resin composition of the present invention preferably ranges from 1000 to 50000 kg/cm$^2$, still preferably from 2000 to 40000 kg/cm$^2$, and particularly preferably from 2500 to 35000 kg/cm$^2$.

If the tensile modulus is less than 1000 kg/cm$^2$, the optical article is liable to deformation and, when used in a laminate form, is deformed to cause distortion in shape and optical characteristics.

On the other hand, if the tensile modulus exceeds 50000 kg/cm$^2$, the optical article often suffers from warpage or optical strain due to curing shrinkage and tends to be cracked or broken. In this case, the article also tends to take a permanent set. That is, once the article suffers deformation during production, getting marks by bending or impressions by indentation, the deformation tends to remain permanently and never recover.

The hardness of an ionizing radiation-cured resin composition is influenced by the rigidity of the resin skeleton, the crosslinking density, the reaction rate, and the like. With a crosslinking density being equal, introduction of a soft component results in reduction in hardness. To avoid this, if the insufficiency of hardness is compensated for by increasing the crosslinking density, shrinkage on curing of the resin composition increases, tending to deform the optical article.

As a means for minimizing the crosslinking density of an ionizing radiation-curable resin composition so as to reduce deformation of the resulting optical article (e.g., curl of a lens array sheet), addition of an ionizing radiation-curable oligomer having a high-molecular weight or a thermoplastic polymer to a resin composition has been studied. However, addition of such a reactive oligomer having a high-molecular weight or a thermoplastic polymer for reduction of crosslinking density results in a considerable increase of the viscosity of the uncured resin composition.

In order to uniformly apply an ionizing radiation-curable resin composition onto a master mold and to make a replica of a master mold having a fine pattern, it is generally desirable that the resin composition has a viscosity ranging form 1000 to 12000 cps, preferably from 1000 to 8000 cps, at 25° C. If the viscosity exceeds 12000 cps or less than 1000 cps, it would be difficult to fill the mold to the finest portions thereof with the resin composition or to apply the resin composition in a continuous manner.

However, if a special coating technique is adopted, application of a resin composition having a viscosity of less than 1000 cps could be achieved without any difficulty. There are cases in which use of such a low viscosity resin composition is preferred. This being the case, a solvent or a reactive diluent is added to the resin composition.

Where the viscosity of a resin composition is decreased by addition of a solvent, etc., an additional step for solvent vaporization is necessary, and after solvent vaporization it will be generally difficult to transfer a fine mold pattern. This difficulty can be coped with by such countermeasures that application of the resin composition to the mold to fill the uneven pattern is followed by stepwise removal of the solvent, thereby making it feasible to adjust the viscosity by addition of a solvent. It is also possible to decrease the viscosity by addition of a reactive diluent, but it should be noted that addition of a large quantity of a reactive diluent results in an increase of shrinkage on curing, leading to deformation of a lens array sheet during production or with time.

As a method for reducing elastic modulus of a cured film, it might be effective to incorporate into a molecular structure a soft segment component having a low glass transition point, such as a polyether, an aliphatic polyester, a polysiloxane, a polyolefin or a polyacrylate mainly comprising an acrylic ester. However, introduction of such a soft segment component results in a reduction of hardness of a cured product, incurring such problems as marring and reduction of durability.

The specific resin composition according to the present invention does not have a high crosslinking density so that deformation of a cured product thereof can be suppressed. That is, the specific ionizing radiation-curable resin composition for an optical article according to the present invention has a polar functional group in the molecule thereof, and the polar functional group forms a hydrogen bond over molecules.

In general, a hydrogen bond is formed between an X—H group and a Y atom, wherein X and Y are each a highly electronegative atom. The highly electronegative atom includes an oxygen atom and a nitrogen atom. In the specific resin composition of the present invention, a hydrogen bond is formed between a hydroxyl group (X=O) present in an epoxyacrylate or a monofunctional acrylate and an oxygen atom (Y=O).

While a hydrogen bond has a bond energy of 1 to 8 kcal/mol, as is weaker than a general chemical bond energy, it forms a quasi crosslinked structure among molecules. In other words, intermolecular hydrogen bonds enhance cohesive force among molecules, which brings about an increased curing rate and improved physical strength.

Thus, the resin composition having the specific composition according to the present invention is capable of forming an intermolecular hydrogen bond and therefore exhibits a higher curing rate as compared with resin compositions constituted solely of a hard segment and provides a cured product with toughness. Deformation and cracking can be prevented during production of a lens array sheet obtained from the resin composition, and the resulting lens array sheet has improved impact resistance.

That is, epoxyacrylate (a) which can be used in the present invention is an epoxyacrylate obtained by the reaction between at least one epoxy resin selected from the group consisting of a bisphenol A epoxy resin, a bisphenol F epoxy resin, a partially halogen-substituted bisphenol A epoxy resin, a partially halogen-substituted bisphenol F epoxy resin, a hydrogenated bisphenol A epoxy resin, and a mixture thereof and (meth)acrylic acid.

Examples of epoxyacrylate (a) are bisphenol A diglycidyl ether diacrylate or phenol novolak, cresol novolak polyglycidyl ether polyacrylate, diglycidyl diacrylate having a naphthalene skeleton, bisphenol F diglycidyl ether diacrylate, and a halogen substitution product of these epoxyacrylates, a hydrogenation product of these epoxyacrylates, and a mixture thereof.

These compounds having a cyclic structure generally provide a cured product having a higher refractive index as compared with a cured resin obtained from a resin composition comprising only a soft segment or a combination of a soft segment and a hard segment and therefore enable designing of an optical article with a reduced thickness and provide a surface light source having improved optical characteristics, such as luminance. In particular, a brominated epoxyacrylate, a partial bromination product of an epoxyacrylate, is preferred because a cured product having a high refractive index and, in addition, flame retardance can be obtained therefrom. A hydrogenated epoxyacrylate is also preferred for improvement in weather resistance and discoloration resistance.

These epoxyacrylates are obtained by reacting a glycidyl ether compound having a cyclic structure in the molecule thereof with a compound having an ethylenically unsaturated double bond and a carboxylic acid moiety, i.e., through ring opening addition reaction of a glycidyl ether with a carboxylic acid. In this reaction, ring opening of a glycidyl ether gives a secondary hydroxyl group as a residual group, which becomes a proton donor for formation of a hydrogen bond.

Monofunctional acrylate (b) which can be used in the present invention includes a known monofunctional acrylate having a saturated or unsaturated carbon ring and a known monofunctional acrylate having a heterocyclic ring, either alone or a combination of two or more thereof.

Typical examples of monofunctional acrylate (b) are isobornyl (meth)acrylate, tetrahydrofurfuryl (meth)acrylate, glycidyl cyclocarbonate (meth)acrylate, phenoxyethyl acrylate, benzyl (meth)acrylate, cyclohexyl (meth)acrylate, dicyclopentanyl (meth)acrylate, dicyclopentenyl (meth) acrylate, glycidyl (meth)acrylate, 2-hydroxy-3-phenoxypropyl (meth)acrylate, (meth)acryloyloxyphthalic acid, phenoxyethylene glycol (meth)acrylate, adamantyl (meth)acrylate, morpholine (meth)acrylate, 2-phenyl-2-(4-acryloyloxyphenyl)propane, a 2-phenyl-2-(4-acryloyloxyalkoxyphenyl)propane, 2,4,6-tribromophenyl acrylate, a 2,4,6-tribromophenoxyalkyl acrylate, and a mixture thereof.

preferred of them are 2-phenyl-2-(4-acryloyloxyphenyl) propane, a 2-phenyl-2-(4-acryloyloxyalkoxyphenyl) propane, 2,4,6-tribromophenyl acrylate, a 2,4,6-tribromophenoxyalkyl acrylate, and a mixture thereof.

The 2-phenyl-2-(4-acryloyloxyalkoxyphenyl)propane is represented by structural formula (I):

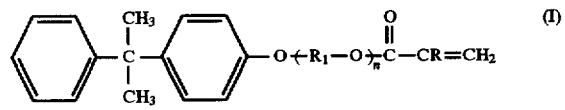

wherein R represents a hydrogen atom or a methyl group; $R_1$ represents a hydrocarbon group having 1 to 5 carbon atoms; and n represents 0 or an integer of 1 to 3.

The 2,4,6-tribromophenoxyalkyl acrylate is represented by structural formula (II):

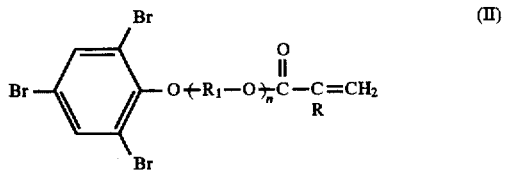

wherein R, $R_1$, and n are as defined above.

Of the compounds represented by formulae (I) and (II), those in which R is a hydrogen atom or a methyl group, $R_1$ is an ethylene group; and n is 0 or 1 are preferred.

A monofunctional reactive diluent having a cyclic structure other than the monofunctional acrylate can also be used in the present invention. Such a compound typically includes styrene and vinylpyrrolidone.

A monofunctional reactive diluent having a cyclic structure and containing a polar function group, such as a hydroxyl group, a cyclic ether group, a cyclocarbonate group, an amino group, an acid group, e.g., a carboxyl group, a phospho group or a sulfo group, and an alkali metal salt thereof, is also preferably used. Such a compound includes tetrahydrofurfuryl (meth)acrylate, glycidyl cyclocarbonate (meth)acrylate, phenoxyethyl acrylate, and 2-hydroxy-3-phenoxypropyl (meth)acrylate.

The resin composition comprising epoxyacrylate (a), monofunctional acrylate (b) and, if necessary, (c) a photo initiator should contain an acrylate functional group in an amount of from 0.2 to 5.0 mmol/g. Epoxyacrylate (a) and monofunctional acrylate (b) may each be used individually or, if desired, as a mixture of two or more thereof. If the acrylate group concentration is lower than 0.2 mmol/g, the resin composition has reduced curing properties and an increased viscosity and thereby deteriorated workability.

If the acrylate group concentration exceeds 5.0 mmol/g, a cured sheet is curled due to shrinkage on curing. With the acrylate group concentration falling within the range of from 0.2 to 5.0 mmol/g, satisfactory curing properties are exhibited, deformation of film such as curl on curing can be prevented, and satisfactory surface hardness can be obtained.

Curl due to deformation should be called to account especially for a lens array sheet among the optical articles of the present invention. Curl is evaluated by cutting a prepared optical lens sheet to an A4 size, placing the cut sheet on a horizontal plane with its lens side up, and measuring the height of the edge of the sheet from the horizontal plane. The curl of a cured product prepared from the ionizing radiation-curable resin composition of the present invention is preferably not more than 1 mm as measured by the above-described evaluation method.

Since deformation of a lens array sheet, i.e., curl and shrinkage percentage of a resin on curing closely correlate, a resin composition which does not cause curling can be determined by obtaining a shrinkage percentage on curing of the resin composition used in the present invention. A shrinkage percentage can be calculated from specific gravity of uncured liquid resin (DL) and that of solid cured resin (DS) according to the equation shown below. The shrinkage percentage of the resin composition used in the present invention is preferably not more than 5.5%.

Shrinkage Percentage (%)=(DS−DL)/DS×100

The ionizing radiation-curable resin Composition of the present invention preferably comprises 10 to 90% by weight, still preferably 30 to 85% by weight, of epoxyacrylate (a) and 10 to 90% by weight, still preferably 20 to 70% by weight, of monofunctional acrylate (b). If monofunctional acrylate (b) is present in a proportion of more than 70% by weight, a cured product of the resin composition tends to give a yield point in a tensile test and is liable to plastic deformation.

The resin composition according to the present invention is, as a matter of course, excellent in transparency, and a 0.4 mm thick specimen of the resin composition has a light transmission of at least 80%, mostly 85% or higher, and preferably 90% or higher, in the wavelength region of 400 to 900 nm.

A permanent set due to outer force should be called to account for the optical articles of the present invention, especially a lens array sheet. A lens array sheet is usually produced in the form of a web of continuous length, which is rolled up around a paper tube and stored in roll form. Before rolling around a paper tube, the leading end of the web is fixed to the paper tube with an adhesive tape. As a result, the adhesive tape makes a difference in level to cause deformation of the lens array sheet, which may lead to a permanent set to leave a trace of deformation.

The permanent set can be evaluated by putting a given load onto a unit area of a prepared optical lens sheet for a given time and observing whether a trace of deformation is perceived after the load is removed. More specifically, a 75 μm thick adhesive tape 1 inch square is adhered to a flat iron plate, and 60 lens array sheets 10 cm square are piled up thereon. A load of 500 g/cm$^2$ is applied on the pile at a temperature of 40° C. for 3 days. After the load is removed, the sheets are observed with the naked eye by means of transmitted light and reflected light. If a trace of deformation is not observed on the 21st sheet counted from the adhesive tape and the other sheets piled thereon, the lens array sheet is regarded satisfactory for practical use.

When an optical article is produced or fitted to a display, there is a possibility of its suffering a surface defect such as scratches. Such fine scratches become a fatal defect for use as an optical element. Therefore, the resin composition to be used in the present invention is required to have high surface hardness, specifically a pencil scratch hardness of H or higher as measured according to JIS K-5400.

If desired, the resin composition may contain various additives for the purpose of modifying the coating film and improving the coating properties and releasability from a mold. Usable additives include ultraviolet absorbers, photostabilizers, antioxidants, rheology control agents, silicone additives, and defoaming agents.

In the present invention, an ionizing radiation is used as an energy ray for curing. The ionizing radiation includes electromagnetic waves, such as visible rays, ultraviolet rays, and X-rays, and charged particles, such as electron beams. Of these radiations visible rays, ultraviolet rays and electron beams are frequently used in practice. In using visible rays or ultraviolet rays for curing the resin composition of the present invention, a photo(polymerization) initiator (c) which is dissociated by ultraviolet rays or visible rays having a wavelength of 1,000 to 8,000 Å to generate a radical should be used in combination.

Any of known and commonly used photo initiators can be used as component (c). Typical examples of useful photo initiators are 4-dimethylaminobenzoic acid, a 4-dimethylaminobenzoic ester, an alkoxyacetophenone, benzyldimethylketal, benzophenone and a derivative thereof, an alkyl benzoylbenzoate, a bis(4-dialkylaminophenyl) ketone, benzil and a derivative thereof, benzoin and a derivative thereof, a benzoin alkyl ether, 2-hydroxy-2-methylpropiophenone, 1-hydroxycyclohexyl phenyl ketone, thioxanthone and a derivative thereof, 2,4,6-trimethylbenzoyldiphenoylphosphine oxide, 2-methyl-1-[4-(methylthio)phenyl]-2-morpholinopropane-1, and 2-benzyl-2-dimethylamino-1-(4-morpholinophenyl)-butanone-1.

Preferred of these photo initiators are one of or a mixture of more than one of 1-hydroxycyclohexyl phenyl ketone, thioxanthone and a derivative thereof, 2,4,6-trimethylbenzoyldiphenoylphosphine oxide, 2-methyl-1-[4-(methylthio)phenyl]-2-morpholino-1-propanone, and 2-benzyl-2-dimethylamino-1-(4-morpholinophenyl)-butane-1-one for their high curing characteristics.

Photo initiator (c) is suitably used in an amount of 0.5 to 10% by weight.

Photo(polymerization) initiator (c) may be used in combination with a known photo sensitizers. Non-limiting typical examples of useful photo sensitizer include amines, urea compounds, sulfur-containing compounds, phosphorus-containing compounds, chlorine-containing compounds, nitriles, and other nitrogen-containing compounds.

In the production of optical articles, irradiation of the curable resin composition with energy rays, such as ultraviolet rays, is often through a transparent resin layer having a sheet form (C) which serves as a support. Accordingly, the photo initiator to be used should preferably have light absorption characteristics in the longer wavelength region. In particular, photo initiators capable of initiating photopolymerization at a wavelength region of from 360 to 450 nm, particularly 400 to 440 nm are preferably used. If a photo initiator which absorbs light of 450 nm or longer wavelengths is used, the resin composition is instable and requires a completely light-shielded environment for the production and is extremely difficult to handle.

Initiators capable of absorbing light of the above-described wavelength region and thereby initiating photopolymerization include 2,4,6-trimethylbenzoyldiphenoylphosphine oxide, thioxanthone, substituted thioxanthones, 2-benzyl-2-dimethylamino-1-(4-morpholinophenyl)-butanone-1, and 2-benzyl-2-dimethylamino-1-(4-morpholinophenyl)-butan-1-one.

Where electron beams are used, neither a photo initiator nor a photo sensitizer is necessary.

A lens array sheet, one of the optical articles of the present invention, can be produced by applying the above-mentioned ionizing radiation-curable resin composition to a master mold to fill the fine uneven pattern, curing the applied curable resin layer (A) by irradiation with ionizing radiation, and removing cured resin layer (A) from the master mold to obtain a lens array sheet having a fine structure copied from the master mold.

Curable resin composition layer (A) is preferably irradiated through transparent resin layer (C) having a sheet form which is provided in intimate contact with one side of curable resin composition layer (A). Transparent resin layer (C) may be stripped off after curing if unnecessary in the final product.

Adhesive layer (B) is not always essential. It is provided between transparent resin layer (C) and curable resin composition layer (A) when necessary depending on the adhesion between cured resin layer (A) and transparent resin layer (C) and the performance demanded for the final product.

Transparent resin layer (C) having a sheet form is used for the purpose of enhancing the physical strength of a lens array sheet and of providing smoothness for the side of a lens array sheet opposite to the fine pattern side (lens side) of the master mold. Where transparent resin layer (C) is not used in the lens array sheet as a final product, it is still recommended to cure the resin composition (A) as sandwiched between a master mold and transparent resin layer (C) having a sheet form and then to remove the resin layer (C) so as to provide a smooth surface.

Where ultraviolet rays are used as an ionizing radiation, use of transparent resin layer (C) is preferred for prevention of curing hindrance due to oxygen in air. If desired, the side of transparent resin layer (C) to be brought into contact with resin composition layer (A) may be subjected to a known release treatment.

The strength of a lens array sheet may be enhanced by increasing the thickness of cured resin layer (A) without using transparent resin layer (C) having a sheet form. However, an increased thickness of resin layer (A) tends to result in non-uniformity of degree of curing in the thickness direction or strain on curing. Hence, integral molding of resin layer (A) and transparent resin layer (C) having a sheet form is recommended from the standpoint of production and strength of a lens array sheet.

Transparent resin layer (C) having a sheet form is required to have mechanical strength (break strength, tensile strength, etc.) against physical shocks as well as uniform thickness, smoothness, transparency, flexibility, and durability.

Transparent resin layer (C) preferably has a sheet form and still preferably has a thickness of about 20 μm to 1 mm. From the viewpoint of processability, film physical properties and transparency, a 50 to 150 μm thick sheet is particularly preferred. Where transparent resin layer (C) is retained in the final product, the surface of layer (C) may be subjected to a surface modification for improving adhesion to layer (A), such as a corona discharge treatment, a plasma treatment or coating with a primer.

Transparent resin layer (C) which can be used includes those having high transparency, for example, polyester sheets (e.g., biaxially stretched polyethylene terephthalate), acrylic resin sheets (e.g., polymethyl methacrylate), polycarbonate sheets, polyvinyl chloride sheets, and polystyrene sheets. Polyethylene terephthalate or polycarbonate sheets are particularly preferred for their durability.

Where a lens array sheet has a laminate structure composed of transparent resin layer (C) having a sheet form and cured resin composition layer (A), not only the durability of layer (A) but the durability of layer (C) and adhesion between these layers are of importance. In this connection, adhesive layer (B) can be provided between transparent resin layer (C) having a sheet form as a support and cured resin layer (A).

Adhesives which can be used as adhesive layer (B) include those comprising (b1) a cellulose resin and (b2) a polyisocyanate, those comprising (b3) a polyester resin having a molecular weight of 3000 to 30000 and polyisocyanate (b2), and those comprising polyester resin (b3) having a molecular weight of 3000 to 30000, an epoxyacrylate having a cyclic structure, and a photo initiator and having an epoxyacrylate content of 10 to 60%.

Accordingly, the lens array sheets according to the present invention includes those comprising cured resin layer (A), adhesive layer (B) comprising cellulose resin (b1) and polyisocyanate (b2), and transparent resin layer (C) comprising a polyester resin or a polycarbonate resin; those comprising cured resin layer (A), adhesive layer (B) comprising polyester resin (b3) having a molecular weight of 3000 to 30000 and polyisocyanate (b2), and transparent resin layer (C) comprising a polyester resin or a polycarbonate resin; and those comprising cured resin layer (A), adhesive layer (B) comprising polyester resin (b3) having a molecular weight of 3000 to 30000, an epoxyacrylate having a cyclic structure and a photo initiator and having an epoxyacrylate content of 10 to 60% by weight, and transparent resin layer (C) comprising a polyester resin or a polycarbonate resin.

Adhesive layer (B) is unnecessary where layers (A) and (C) have sufficient adhesion with each other or where the adhesion of layer (C) to layer (A) is sufficiently improved by the above-described surface modification such as a corona discharge treatment, a plasma treatment or coating with a primer. It is also possible to use adhesive layer (B) in combination with the surface modification of layer (C) for the purpose of further improving the adhesion.

Adhesive layer (B) should be selected from those having excellent adhesion to both transparent resin layer (C) as a support and cured resin layer (A) having a fine structure. A resin composition comprising a thermoplastic resin and polyisocyanate (b2), a resin composition comprising a thermoplastic resin and an acrylate compound, and a resin composition comprising polyisocyanate (b2) and polyester (b3) are particularly preferred as adhesive layer (B) to be used in the present invention because of their excellent adhesion.

The thermoplastic resins as referred to above include those commonly known and employed. Suitable examples of the thermoplastic resins are cellulose resins (b1) including various cellulose esters and ethers, acrylic resins, e.g., various (meth)acrylic ester polymers called acrylic lacquers, polyester resins, e.g., high-molecular weight oil-free polyesters, polycarbonate resins, and polyester type or polyether type polyurethanes. Cellulose resins (b1) and polyester resins (b3) are particularly preferred.

Cellulose ester resins are obtained by partially esterifying the hydroxyl groups of a cellulose with one or more acids, such as nitric acid, sulfuric acid, acetic acid, propionic acid, butyric acid, and other higher fatty acids. Cellulose ester resins obtained by esterification with acetic acid, propionic acid or butyric acid are particularly preferred. Cellulose ether resins can also be used as well. Cellulose resins having both ester and ether linkages are also employable for preference.

Polyester resins (b3) as referred to above include known and commonly used polyester resins which are obtained by esterification or interesterification between a saturated or unsaturated polyol and a polybasic acid or a lower alkyl ester thereof. Polyester resins (b3) preferably have a molecular weight of 3,000 to 30,000.

Any of known polyols may be used as a starting material for polyester resins. Typical examples of useful polyols are ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decanediol, 2,2,4-trimethyl-1,3-pentanediol, 3-methyl-1,5-pentanediol, dichloroneopentyl glycol, dibromoneopentyl glycol, neopentyl glycol hydroxypivalate, cyclohexanedimethylol, 1,4-cyclohexanediol, trimethylolethane, trimethylolpropane, glycerol, 3-methylpentane-1,3,5-triol, pentaerythritol, dipentaerythritol, tripentaerythritol, spiroglycol, tricyclodecanedimethylol, and hydrogenated bisphenol A.

The polybasic acid or an ester thereof to be used can be selected from various known carboxylic acids or anhydrides thereof or esters thereof with lower alkyl alcohols. Typical examples of useful polybasic acid compounds are maleic acid, fumaric acid, itaconic acid, citraconic acid, tetrahydrophthalic acid, HET acid, hymic acid, chlorendic acid, dimer acid, adipic acid, succinic acid, an alkenylsuccinic acid, sebacic acid, azelaic acid, 2,2,4-trimethyladipic acid, 1,4-cyclohexanedicarboxylic acid, terephthalic acid, sodium 2-sulfoterephthalic acid, potassium 2-sulfoterephthalic acid, isophthalic acid, sodium 5-sulfoisophthalate, potassium 5-sulfoisophthalate, di(lower alkyl) esters of sodium 5-sulfoisophthalate (e.g., dimethyl or diethyl ester), orthophthalic acid, 4-sulfophthalic acid, 1,10-decamethylenedicarboxylic acid, muconic acid, oxalic acid, malonic acid, glutaric acid, trimellitic acid, hexahydrophthalic acid, tetrabromophthalic acid, methylcyclohexenetricarboxylic acid, and pyromellitic acid, and anhydrides of these acids or esters of these acids with an alcohol, e.g., methanol or ethanol.

The (meth)acrylic esters as referred to above can be selected from those known and commonly employed. Examples of useful (meth)acrylic esters are alkyl (meth) acrylates, such as methyl (meth)acrylate and ethyl (meth) acrylate, (meth)acrylates having a cyclic structure, and polyoxyalkylene (meth)acrylates.

The cyclic ester compounds include lactones, such as γ-butyrolactone, γ-valerolactone, δ-valerolactone, ε-caprolactone, D-glucono-1,4lactone, 1,10-phenanthrenecarbolactone, 4-penten-5-olide, and 12-dodecanolide.

The acrylate compound which can be preferably used in the adhesive layer includes those usually used as a reactive diluent and various acrylate oligomers and polymers. For example, one or more than one of epoxyacrylates, urethane acrylates, polyester acrylates, and polyether acrylates may be used.

Preferred of them are epoxyacrylate compounds for their adhesion to a cured resin layer having a fine pattern. The epoxyacrylates to be used in the adhesive layer can be selected from those illustrated above with respect to the ionizing radiation-curable resin composition. The acrylate compound is suitably used in an amount of 10 to 60% by weight based on the adhesive layer resin.

If the amount of the acrylate compound is less than 10% by weight, the adhesion to resin layer (A) tends to be reduced, or the adhesive layer tends to undergo whitening in a water resistance test. If the amount of the acrylate compound is more than 60% by weight, the adhesive layer tends to have reduced adhesion to the support.

The polyester type or polyether type polyurethanes include polyurethane resins obtained by the reaction between a polyester polyol having a polyester molecular weight of about 500 to 4000 or a polyalkylene oxide (e.g., polyethylene glycol, polypropylene glycol or polytetramethylene glycol) and a polyisocyanate.

The polyisocyanate to be used here may be either a single Compound or a combination of a polyisocyanate having the form of an isocyanurate and an isocyanate compound. Any of known bi- or polyfunctional isocyanates can be used. Typical examples of useful polyisocyanates include alicyclic diisocyanate compounds, such as tolylene diisocyanate, diphenylmethane diisocyanate, xylylene diisocyanate, dicyclohexylmethane diisocyanate, isophorone diisocyanate, and hydrogenated xylylene diisocyanate; aliphatic diisocyanate compounds, such as hexamethylene diisocyanate and lysine diisocyanate; and isocyanate oligomers having the form of a biuret, an allophanate or an isocyanurate, derived from the above-mentioned isocyanate monomer; and polyisocyanates obtained by the reaction with a polyol. These polyisocyanates may be used either individually or as a combination thereof. Preferred of them are polyisocyanate compounds having three or more isocyanate groups per molecule, with those derived from hexamethylene diisocyanate being still preferred.

In view of adhesion reliability, a thermoplastic resin and a polyisocyanate are preferably used at such a ratio that the ratio of hydroxyl equivalent of the former to isocyanate equivalent of the latter, i.e., OH equivalent/NCO equivalent, falls within a range of from 0.1 to 5, particularly from 0.1 to 1. Adhesive layer (B) suitably has a thickness of 0.2 to 10 μm.

To begin with, transparent resin layer (C) having a sheet form is provided with adhesive layer (B). If desired, the solvent, etc. is evaporated by allowing adhesive layer (B) to stand for an appropriate setting time or applying heat. Thereafter, ionizing radiation-curable resin composition is applied to a master mold having a desired fine pattern, and the master mold is brought into close contact with adhesive layer (B). Curable resin layer (A) is then cured by irradiation with an ionizing radiation to form cured resin layer (A) firmly adhered to transparent resin layer (C).

In order to increase reactivity of adhesive layer (B), it is preferable to add a photo(polymerization) initiator to adhesive layer (B), especially an adhesive resin composition comprising a thermoplastic resin and an acrylate compound. Such an initiator can be chosen from among the above-mentioned photo initiators.

The process for producing a lens array sheet, one of the optical articles of the present invention, is not particularly limited. While various known techniques can be applied, processes disclosed in U.S. Pat. Nos. 3,689,346 and 4,576,850, JP-B-63-50066, and JP-A-5-169015 are used by preference. Production of a lens array sheet will be illustrated below by referring to FIG. 4

Figure 4:
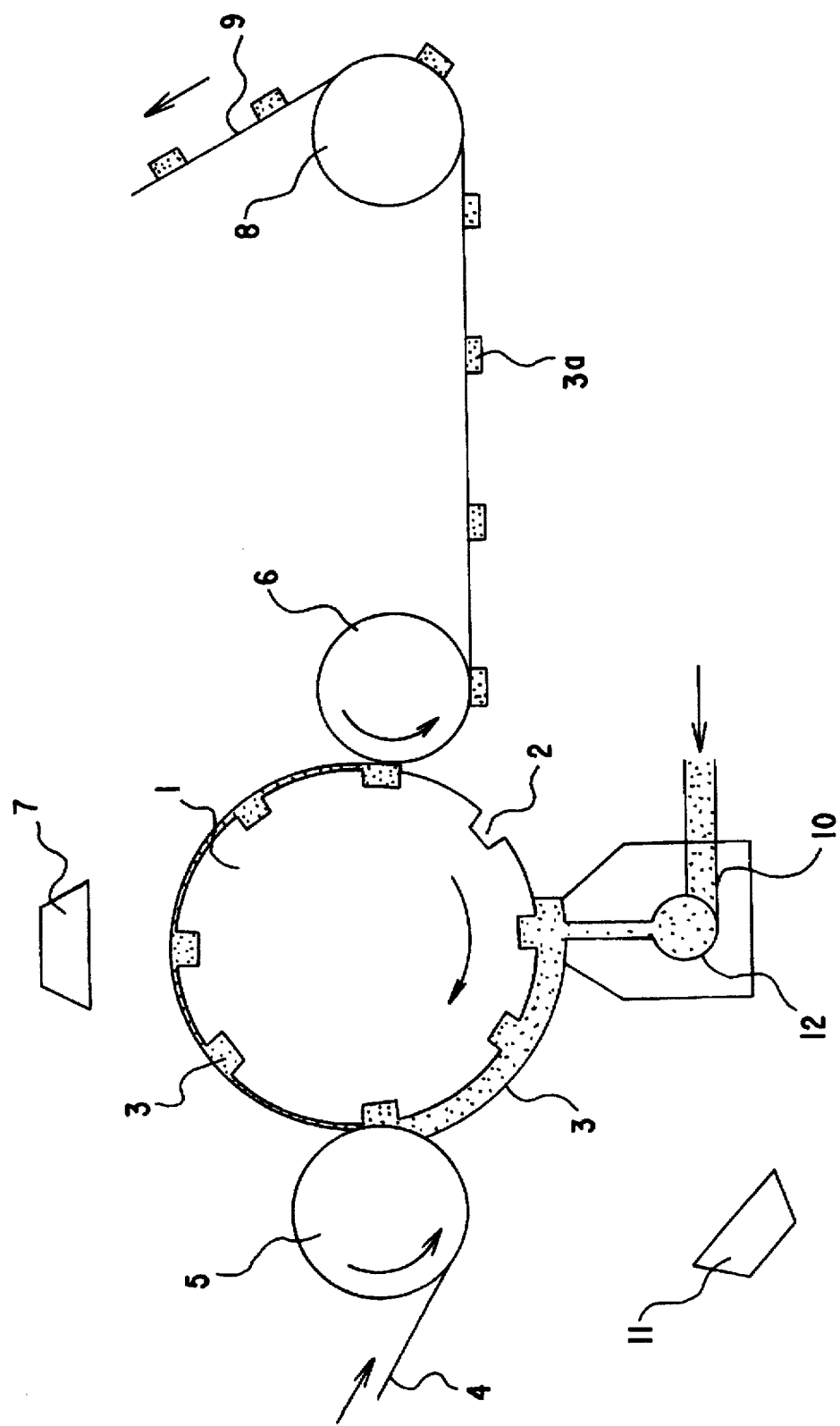
FIG. 4 illustrates an example of the process for continuously producing a lens array sheet according to the present invention.

In FIG. 4, numeral 1 is an intaglio printing roll having a desired engraved pattern; 2, a concavity of intaglio printing roll 1; 3, an uncured ionizing radiation-curable resin composition; 3a, a cured ionizing radiation-curable resin composition; 4, transparent base sheet (C) having, if desired, adhesive layer (B); 5, a press roll which presses intaglio printing roll 1; 6 and 8, lead-on rolls; 7, ionizing radiation irradiation equipment; 9, a lens array sheet; 10, a T-die nozzle; 11, a drier; and 12, a reservoir.

As shown in FIG. 4, a prescribed amount of ionizing radiation-curable resin composition 3 is supplied to the surface of intaglio printing roll 1. When base sheet 4 is fed to roll 1, pressure of press roll 5 is given through base sheet 4 to the curable resin composition 3 on roll 1, thereby to fill concavity 2 with resin composition 3.

In this case, a solvent type curable resin composition can be used, for the solvent can be evaporated by means of drier 11. Irradiation equipment 7 may be composed of one curing apparatus as shown in FIG. 4, or a plurality of curing apparatus may be used so as to cure resin composition 3 stepwise. In the latter case, a sufficient irradiation dose is assured even if the running speed of base sheet 4 is increased. In addition, gradual curing is favorable for alleviating strain of resin composition 3 on curing or curl or strain of base sheet 4.

Curable resin composition 3 is cured by means of irradiation equipment 7 while base sheet 4 is in contact with intaglio printing roll 1, specifically between press roll 5 and lead-on roll 6. While, in this particular case, resin composition 3 is irradiated from the side of base sheet 4, it may be irradiated from the inside of intaglio printing roll 1, specifically by means of irradiation equipment set inside a hollow printing roll, provided that the printing roll is made of a material transmitting an ionizing radiation, such as quartz or glass. Irradiation may be effected from both the base sheet side and the inside of the printing roll.

After resin composition 3 in concavity 2 thus cured and adhered to base sheet 4 passes under the irradiation equipment 7, base sheet 4 is separated from intaglio printing roll 1 thereby separating cured resin composition 3a as integrated with base sheet 4 from concavity 2 to provide lens array sheet 9 having an uneven surface.

Transparent base sheet 4 which can be used in the above-mentioned production process includes a sheet of thermoplastic resins, such as polyester resins, e.g., polyethylene terephthalate, polybutylene terephthalate, and polyethylene naphthalate, acrylic resins, e.g., polymethyl methacrylate, polycarbonate resins, and polystyrene resins. The thickness of base sheet 4 is decided from workability in, for example, handling of the apparatus and is usually from 10 to 1000 μm.

If no base sheet is necessary in the final product, the side of the base sheet which is to be brought into contact with resin layer 3 is previously subjected to a treatment for easy release from a cured resin, for example, by coating with a release agent, such as a silicone resin or a melamine resin, and on completion of the above-mentioned process the base sheet is stripped off the lens array sheet.

The terminology "ionizing radiation" means electromagnetic waves or charged particles having a sufficient energy quantum for inducing polymerization and crosslinking of molecules, and ultraviolet rays and electron beams are usually used. Radiation sources for ultraviolet rays include a high pressure mercury lamp, a medium pressure mercury lamp, a low pressure mercury lamp, a carbon arc lamp, a black light lamp, a metal halide lamp, etc. Ultraviolet wavelengths of 1900 to 3800 Å are usually employed.

Electron beam irradiation equipment which can be used includes apparatus equipped with a radiation source, such as accelerators of various types, e.g., Cockcroft-Walton type, Van de Graff type, resonance transformer type, insulated core transformer type, liniac type, Daynamitron type and radiofrequency type. These radiation sources emit electrons having energy of 100 to 1000 KeV, preferably 100 to 300 KeV. A preferred irradiation dose is usually about 0.5 to 30 Mrad.

Drier 11 in FIG. 4 is an apparatus for evaporating the solvent of resin composition 3. Useful drier 11 includes a warm air drier and an infrared heater. Drier 11 is not necessary where a solventless curable resin is used.

In FIGS. 5 through 9 are shows perspective views of typical lens array sheets as examples of the optical elements according to the present invention, in which unit lenses comprising a cured product of the ionizing radiation-curable resin composition of the present invention are arrayed unidirectionally or bidirectionally to form an array of lenses.

Figure 5:
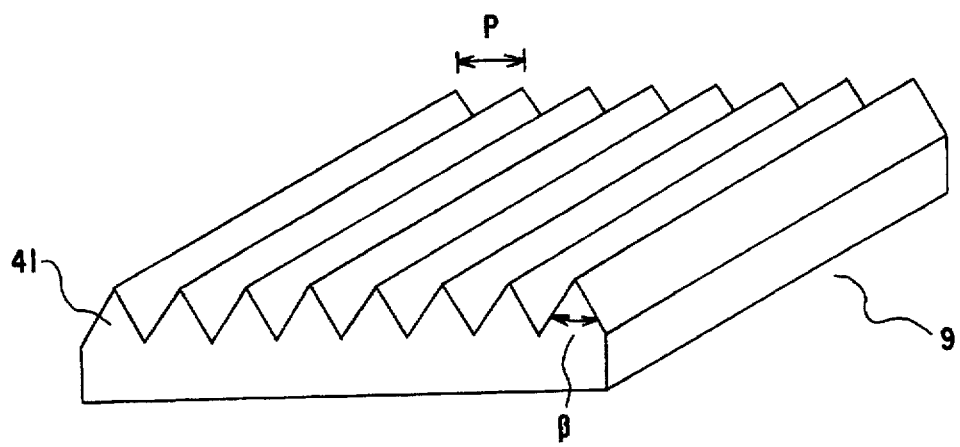
FIG. 5 is a schematic view of an example of a lens array sheet according to the present invention

FIG. 5 shows lens array sheet 9 called a triangular prism linear array sheet, in which a number of triangular prisms (unit lenses) 41 are arrayed contiguously and unidirectionally (in the direction perpendicular to the ridges of the prisms) on a plane in such a manner that their ridges are in parallel with each other. Vertical angle β is typically about 60° to 120°. Pitch P is typically 20 to 500 μm.

Figure 6:
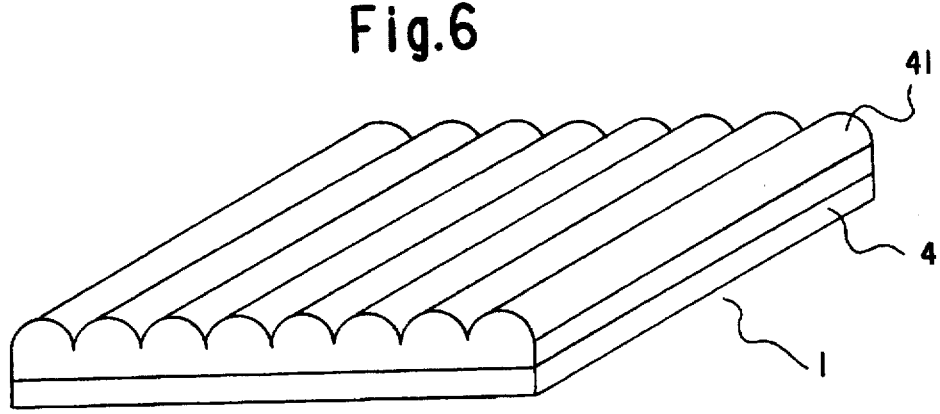
FIG. 6 is a schematic view of an example of a lens array sheet according to the present invention

FIG. 6 shows lens array sheet 9 called a lenticular lens, in which a number of semicircular or semielliptic cylindrical convex lenses (unit lenses) 41 are arrayed contiguously and unidirectionally (in the direction perpendicular to the ridges) in such a manner that their ridges are in parallel with each other.

Figure 7:
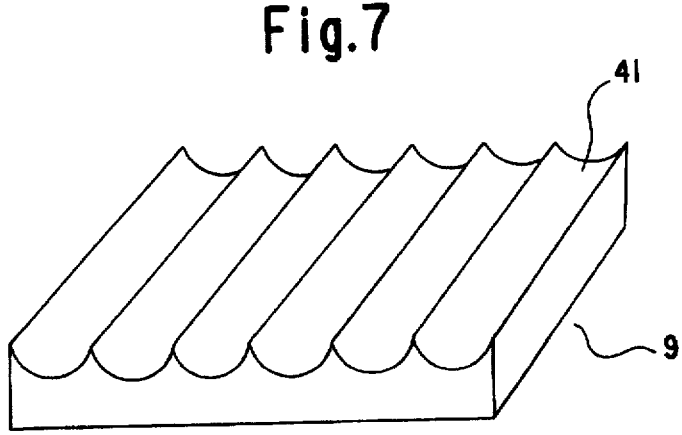
FIG. 7 is a schematic view of an example of a lens array sheet according to the present invention

The lens array sheet shown in FIG. 7 uses concave unit lenses in place of convex unit lenses used in FIG. 6 and may be called a concave lenticular lens.

Figure 8:
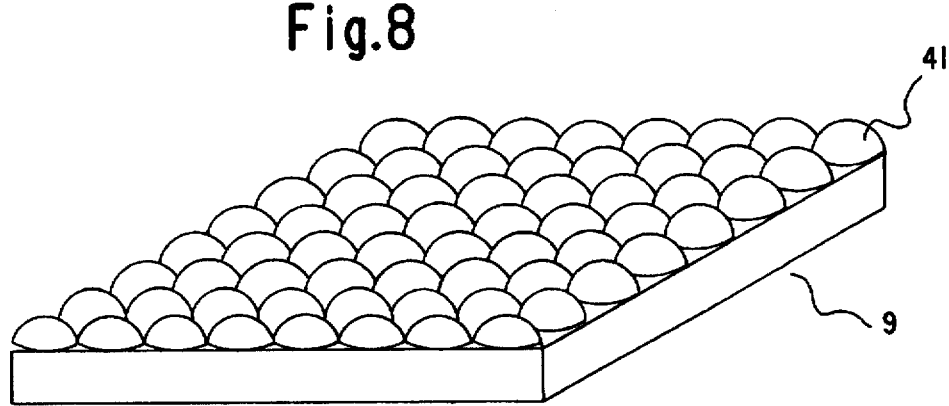
FIG. 8 is a schematic view of an example of a lens array sheet according to the present invention

FIG. 8 illustrates lens array sheet 9 called a fly eye lens, in which a number of semispherical or semispheroidal unit lenses are arrayed bidirectionally.

Figure 9:
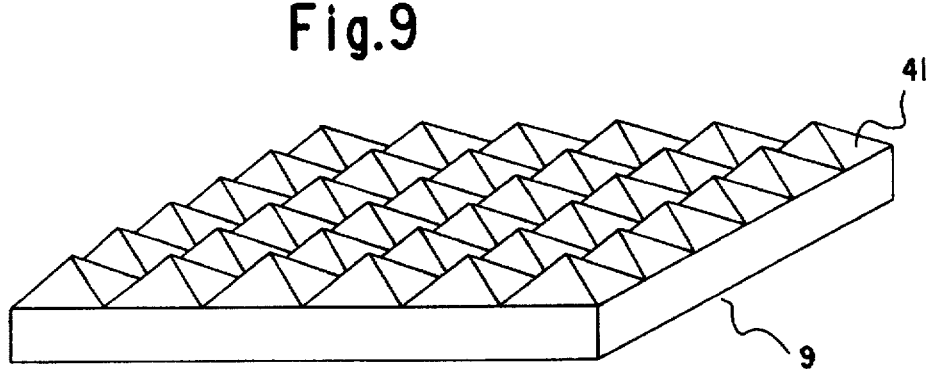
FIG. 9 is a schematic view of an example of a lens array sheet according to the present invention

FIG. 9 shows lens array sheet 9 in which a number of quadrangular pyramidal unit lenses are arrayed bidirectionally.

It should be understood that the lens array sheets shown in FIGS. 5 to 9 are only illustrative examples and the lens array sheets of the present invention are not limited thereto. For example, the following embodiments are included under the optical elements of the present invention.

(1) Individual unit lenses may have different shapes as in Fresnel lenses, or unit lenses may be arrayed nonperiodically (the units lenses in FIGS. 5 to 9 have the same shape and are arrayed periodically).

(2) Unit lenses may be either convex lenses or concave lenses or may be a combination of both.

(3) The concept of "lens" used in the present invention covers all the elements which exert modulation or control on light, such as collection, polarization or diffusion, through refraction or inside reflection of transmitted light, and includes prisms, diffraction gratings, and holograms.

Figure 10:
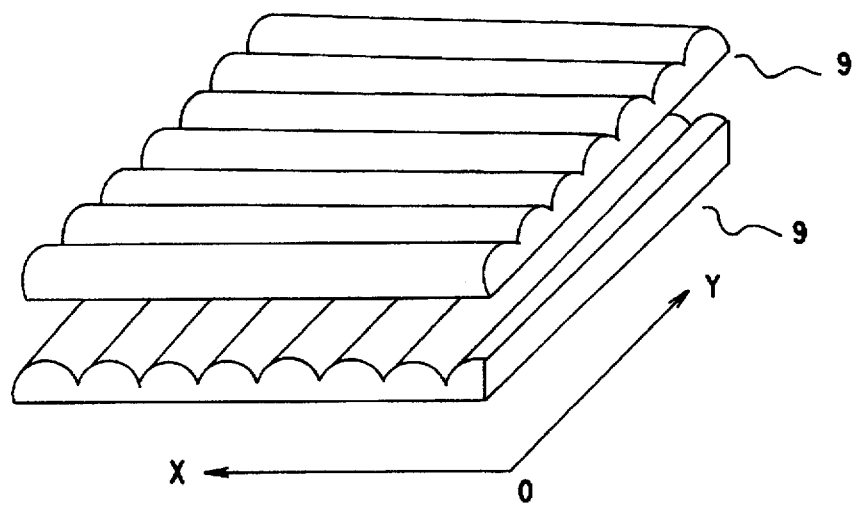
FIG. 10 is a schematic view of an example of a lens array sheet according to the present invention

(4) The lens array sheets of the present invention may be used either singly as in FIGS. 5 to 9 or, if desired, as a combination of two or more thereof as shown in FIG. 10. For example, a cross-laminate of two lens array sheets with the ridges crossing each other as in FIG. 10 is capable of controlling or modulating transmitted light in both directions X and Y.

(5) The lens array sheets may have either a single layer structure comprising a cured resin composition as in FIGS. 5 and 7 to 9 or a two layer structure comprising an array of lenses 41 supported by transparent base sheet 4 (inclusive of a plate or a film) as in FIG. 6.

(6) The lens array sheets may have an array of lenses on one side thereof as in FIGS. 5 to 9 or on both sides thereof.

The master mold having a fine pattern of a lens array sheet includes a mold providing a Fresnel lens, a lenticular lens or a fly eye lens and a modified mold having, for example, a number of unit concavities of the same shape such as a pyramid, a circular truncated cone or a prismoid arrayed in every direction on a plane. The pyramid or prismoid is preferably a regular triangular pyramid (or prismoid), a regular quadrangular pyramid (or prismoid), or a regular hexangular pyramid (or prismoid) because they can be arrayed on a plane without leaving gaps among themselves, their shape is isotropic and gives the same half value angle in both the horizontal and vertical directions, and they cause no fluctuation depending on positions.

It is also possible to use a mold made of a metal or a synthetic resin having a reversed (negative) uneven pattern of the shape of an optical member, such as an array of a plurality of continuous trihedral or tetrahedral prism elements. These master molds may have a fine pattern on a plane or on the surface of a cylindrical form.

The surface light source according to the present invention will be illustrated below.

The surface light source of the present invention is composed essentially of a light conducting plate comprising a light transmitting plate, at least one light source unit adjoining one of side edges of the light conducting plate, a light reflecting layer provided on the back side of the light conducting plate, and one or two optical articles (lens array sheets) according to the present invention which are laminated on the light emitting side of the light conducting plate. A generally called edge light type surface light source can be mentioned as a typical example.

Figure 11:
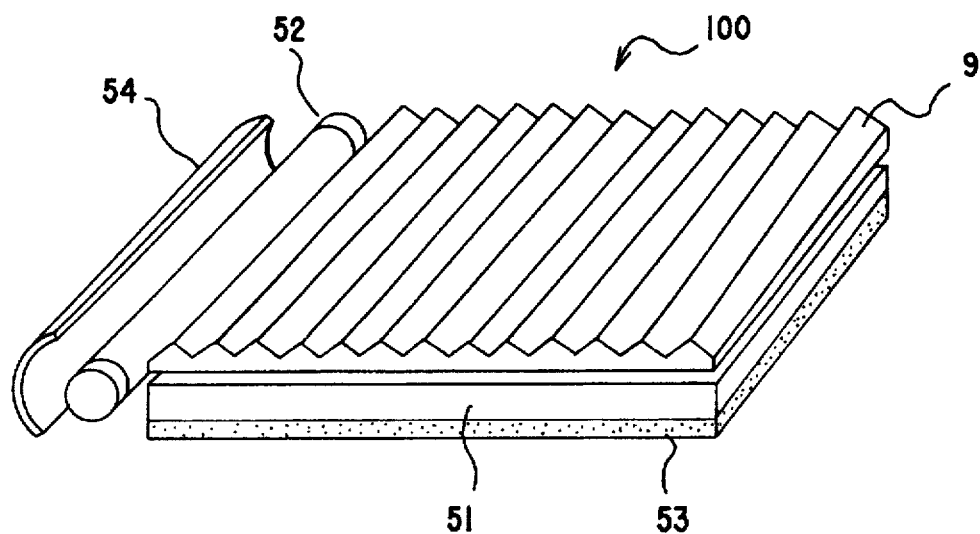
FIG. 11 is a schematic view of an example of a surface light source according to the present invention.

FIG. 11 shows a perspective view of one example of the surface light source of the present invention. This surface light source is composed essentially of light conducting plate 51, linear or point source of light 52 adjoining at least one of the side edges of the light conducting plate, light reflecting layer 53 adjacent to light conducting plate 51, and optical article (lens array sheet) 9 of the present invention. Lamp housing 54 having a reflecting surface on the inner side thereof is usually provided around surface light source 52.

Light conducting plate 51 is generally a transparent plate made of an acrylic resin, a polycarbonate resin, glass, etc. and having a thickness of about 1 to 100 mm. The thickness of the transparent plate may be uniform throughout its full length but is preferably made smaller as the distance from the light source becomes longer so that the luminance of output light may be constant irrespective of the distance from the light source. Light source 52 includes a fluorescent tube, e.g., a cold cathode gas discharge tube as a linear light source and an incandescent lamp and a light emitting diode as a point light source.

For diffuse reflection of light, light reflecting layer 53 generally comprises a diffuse reflecting dot pattern provided, for example, by printing in a white ink and has on the back side thereof a metallic film built up by vacuum evaporation or plating. The area ratio of the diffuse reflecting dot pattern is usually increased with the distance from the light source so as to obtain uniform light quantity from the light emitting side. In some cases, a light diffusing transparent sheet is provided between light conducting plate 51 and lens array sheet 9 so as to uniformly diffuse light and to veil the light diffusing dot pattern of light reflecting layer 53.

The lens array sheet may be mounted on the light conducting plate with its lens side facing to either the light conducting plate or the opposite side (the light emitting side).

The number of the lens array sheets may be one, but in the case of an array of prism lenses, two lens array sheets can be laid one on the other in such a manner that the ridges of unit lenses may cross with each other as shown in FIG. 10 (at right angles in the case of FIG. 10) so that the angle of light diffusion may be controlled in two directions (width and length directions). In this case, two lens array sheets are preferably placed with their lens side facing the same direction for obtaining high light transmission and for prevention of a Moire fringe which would be generated between the lens side of the lower lens array sheet and fine projections on the back side of the upper lens array sheet. As a matter of course, the two sheets may be placed with their lens side facing each other.

Figure 12:
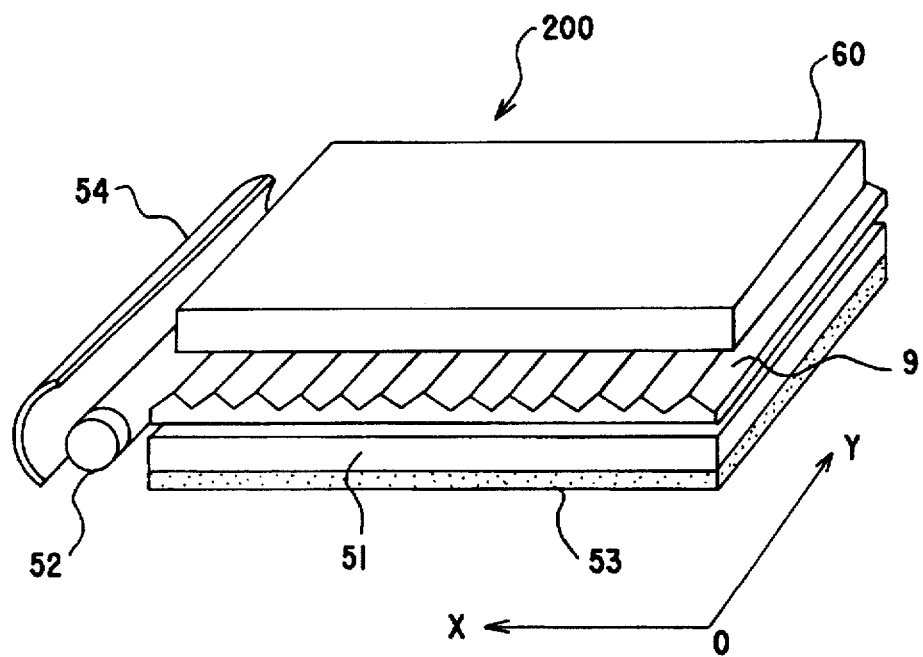
FIG. 12 is a schematic view of an example of a surface light source according to the present invention.

The edge light type surface light source of the present invention can be applied to various uses. For example, it is useful in transmission LCD, illuminated advertizing signs or boards, traffic control signs, light tables for viewing negative or positive photographic films, and interior lighting units, and the like. In FIG. 12 is shown an application example wherein transmission liquid crystal display element 60 is put on surface light source 100 of FIG. 11 to provide LCD 200.

Preferred performance properties of a surface light source are described, e.g., in JP-A-5-169015 and other publications. While brightness in the normal direction (normal luminance) of a display screen is usually 1000 cd/cm$^2$ or more, it is not necessary to set a particular upper limit of normal luminance because a brighter light source is better.

In TV sets, word processors, LCD, etc., since a broad visual field over the horizontal direction is demanded, it is desirable that reduction of luminance due to light diffusion from the normal be minimized, that is, luminance in the normal be not reduced over a wide angle. Accordingly, a surface light source to be used in these displays preferably has a wide half value angle, i.e., an angle at which the normal luminance is reduced by half. The half value angle of the surface light source for these uses is 30° to 90°, preferably 45° to 90°.

EXAMPLES

The present invention will now be illustrated in greater detail with reference to Examples and Comparative Examples, but it should be understood that the present invention is not deemed to be limited thereto. Unless otherwise indicated, all the parts and percents are by weight.

Synthesis Example 1

In a flask equipped with a thermometer, a stirrer and a condenser was charged 350 parts of a ring opening reaction product (OH value: 165 KOH-mg/kg) between ε-caprolactone and hydroxyethyl acrylate and heated to 60° C. with stirring. To the flask was added dropwise 180.3 parts of a biuret type polyisocyanate derived from hexamethylene diisocyanate (NCO content: 23.3%) over a period of 1 hour while giving care to heat generation. The reaction was carried on over 10 hours and, after confirming disappearance of the absorption of an isocyanate group in the infrared absorption spectrum, 123 parts of neopentyl glycol diacrylate was added to the reaction mixture and dissolved therein to obtain a desired composition having no cyclic structure (hereinafter designated S-1).

Synthesis Example 2

In a flask equipped with a thermometer, a stirrer and a condenser was charged 350 parts of a ring opening reaction product (OH value: 165 KOH-mg/kg) between ε-caprolactone and hydroxyethyl acrylate and heated to 60° C. with stirring. To the flask was added dropwise 177 parts of an isocyanurate type polyisocyanate derived from hexamethylene diisocyanate (NCO content: 23.8%) over a period of 1 hour while giving care to heat generation. The reaction was carried on over 10 hours and, after confirming disappearance of the absorption of an isocyanate group in the infrared absorption spectrum, 123 parts of neopentyl glycol diacrylate was added to the reaction mixture and dissolved therein to obtain a desired composition having a cyclic structure and a soft segment (a ring-opened product of ε-caprolactone) (designated SH-1).

Comparative Synthesis Example 1

In a flask equipped with a thermometer, a stirrer and a condenser was charged 524 parts of diphenylmethane diisocyanate and heated to 60° C. with stirring. To the flask was added dropwise 520 parts of a ring opening reaction product (OH value: 215 KOH-mg/kg) between ε-caprolactone and 1,6-hexanediol over a period of 1 hour while giving care to heat generation. The reaction was carried on over 10 hours, and 232 parts of hydroxyethyl acrylate was added thereto, followed by further continuing the reaction for 10 hours. After confirming disappearance of the absorption of an isocyanate group in the infrared absorption spectrum, an urethane acrylate containing a hard segment and a soft segment was obtained as a comparative composition (designated RSH-1).

Comparative Synthesis Example 2

In a flask equipped with a thermometer, a stirrer and a condenser was charged 444 parts of isophorone diisocyanate and heated to 60° C. with stirring. To the flask was added dropwise 2200 parts of a polyester diol (OH value: 51 KOH-mg/kg) obtained by the reaction between 1,6-hexanediol and adipic acid over a period of 1 hour while giving care to heat generation. The reaction was carried on over 10 hours, and 232 parts of hydroxyethyl acrylate was added thereto, followed by further continuing the reaction for 10 hours. After confirming disappearance of the absorption of an isocyanate group in the infrared absorption spectrum, 1917 parts of tripropylene glycol diacrylate was added to the reaction mixture and completely dissolved therein to obtain an urethane acrylate containing a hard segment and a soft segment as a comparative composition (designated RSH-2).

EXAMPLES 1 TO 12

Ionizing radiation-curable resin compositions (A) for an optical sheet were prepared according to the formulations shown in Table 1 below.

A continuous optical sheet was prepared using each of the resulting resin compositions by means of the apparatus shown in FIG. 4 as follows. A metallic intaglio printing roll was revolved on its axis. The printing roll had on its surface a negative model of a retroreflective lens comprising a plurality of regular tetrahedrons two-dimensionally arrayed at a pitch of 50 μm. Resin composition (A) was applied from a T-die nozzle onto the surface of the revolving roll. Transparent resin layer (C) having a sheet form (transparent polyethylene terephthalate (PET) film one side of which had been subjected to a corona discharge treatment) was run at a speed synchronized with the revolution of the roll, and the corona discharge treated surface thereof was brought into contact with the roll with resin composition (A) therebetween. Resin composition (A) was irradiated from the PET film side by means of two medium pressure mercury lamps (160 W/cm) placed 10 cm away thereby cured and adhered to the PET film. The UV irradiation dose on the PET film surface was 500 mJ/cm$^2$. After curing, the PET film and the cured resin layer were separated from the roll to obtain a continuous sheet having a desired pattern transferred thereon.

The physical properties of the resulting optical sheet and the cured resin were evaluated in terms of permanent set, curl, adhesion, and the like. The results obtained are shown in Table 2.

Further, each of the resin composition prepared was applied to a clear and smooth glass plate to a thickness of 60 to 70 μm and irradiated with 500 mJ/cm$^2$ of ultraviolet light by means of a medium pressure mercury lamp (160 W/cm) to prepare test pieces of the cured product. The cured product was evaluated in terms of tensile characteristics and curability. The results obtained are also shown in Table 2.

Comparative Examples 1 and 2

Comparative ionizing radiation-curable resin compositions for an optical sheet were prepared according to the formulations shown in Table 3 below. A lens array sheet and a test piece of a cured product for evaluation tests were prepared using each of the resin compositions in the same manner as in Examples 1 to 12. The results of the evaluation are shown in Table 3 and table 4.

EXAMPLES 13 AND 14

A 100 μm thick transparent PET film as transparent resin layer (C) having a sheet form was coated with adhesive layer (B) having a dry thickness of about 1 μm by means of a roll coater. The solvent contained in the applied adhesive layer was evaporated by heating at 80° C. for 30 seconds. The resin composition of adhesive layer (B) is shown below.

A lens array sheet was prepared and evaluated in the same manner as in Examples 1 to 12, except that the resin composition used in Example 1 or 6 was used as UV-curable resin (A) in Example 13 or 14, respectively, and that the above-prepared Pet film coated adhesive layer (B) was used as transparent resin layer (C) in place of the transparent PET film having one side thereof treated by a corona discharge (the UV-curable resin layer was laminated on adhesive layer (B)). The results of evaluation are shown in Table 4.

Resin Composition of Adhesive Layer (B) in Example 13

Ten parts of a high-molecular weight oil-free polyester resin (a condensation product of terephthalic acid, isophthalic acid, adipic acid, ethylene glycol, 1,6-hexanediol, and neopentyl glycol; molecular weight: about 5000), 2 parts of bisphenol A diglycidyl ether diacrylate, 4 parts of toluene, and 4 parts of butyl acetate, totaling up to 20 parts.

Resin Composition of Adhesive Layer (B) in Example 14

Fifteen parts of a cellulose acetate butyrate resin (degree of butylation: 37%; degree of acetylation: 13%; residual hydroxyl group content: 2%), 40 parts of toluene, 40 parts of methyl ethyl ketone, and 5 parts of a trimethylolpropane adduct type polyisocyanate derived from hexamethylene diisocyanate (NCO content: 16.7%), totaling up to 100 parts.

Measurement and Evaluation Methods

The measurement and evaluation methods are described below.

(1) Viscosity

Measured with an E type rotational viscometer at 25° C. Unit: cps (2) DB Concentration An acrylate functional group concentration (mmmol/g) in a resin composition.

(3) Refractive Index

Measured on both a liquid sample and a cured sample. A liquid sample was applied directly on the prism of an Abbe's refractometer, and measurement was made at 25° C.

A resin layer cured on a glass plate and stripped was used as a cured sample. The viscosity of the sample was measured with an Abbe's refractometry at a sample temperature of 25° C. using 1-bromonaphthalene as an intermediate liquid for intimate contact between the sample and the prism.

(4) Tensile Characteristics

A test piece was punched out of the above-described cured sheet with a dumbbell die "Super Dumbbell" manufactured by Dumbbell Co. (JIS 7113 No. 2 dumbbell), and tensile strength, tensile elongation, and tensile modulus were measured. Four points (upper and lower, right and left) on each end portion of the test piece outside the length between bench marks were fixed to a 0.3 mm thick and 20 mm square iron plate with an adhesive ("Allon Alpha" produced by Toagosei Chemical Industry Co., Ltd.) so that the chucks may bite the test piece to prevent a slide of the test piece during measurement.

Measurement was made with "Tensilon" manufactured by Toyo Baldwin Co., Ltd. at a rate of strain of 1.0 mm/min in an atmosphere of 25° C. and 50% RH. Tensile strength, tensile elongation, and tensile modulus: A tensile test was conducted in the same manner as for measurement of modulus of rigidity. The stress and elongation at break were measured to obtain tensile strength and tensile elongation, respectively. Tensile modulus was calculated from the initial tangent modulus (slope of an initial tangent line in the stress-strain curve). Measurement was made 5 times for each sample, and the average of the results is shown in the table. Evaluation of elasticity ($\sigma 2/\sigma 1$): $\sigma 2$ and $\sigma 1$ were read from the thus obtained stress-strain curve having such a pattern as depicted in FIG. 3 to calculate a $\sigma 2/\sigma 1$ ratio. Evaluation of pattern of stress-strain curve: A stress-strain curve having no yield point as in FIG. 1 was graded A, and one having a yield point as in FIG. 2 was graded B.

(5) Permanent Set

A 75 μm thick, 1 in square PET adhesive tape was adhered to the center of a flat and smooth iron plate, and 60 lens array sheets 10 cm square were piled up thereon with their UV-cured resin layer up. A load of 500 g/cm² was applied on the pile and allowed to stand at a temperature of 40° C. for 3 days. After release of the applied load, every sheet was observed with the naked eye by means of transmitted light or reflected light of a fluorescent tube to examine the number of the sheets, as counted from the bottom of the pile, which were perceived to have a trace of deformation (permanent set).

Standards of Evaluation

Good . . . No trace of deformation was perceived on the 21st (counted from the adhesive tape) and farther sheets.

Bad . . . A trace of deformation was perceived on the 21st (counted from the adhesive tape) or farther sheets.

(6) Light Transmission

A light transmission of a 0.4 mm thick test piece was measured in a wavelength region of 400 to 900 nm. A test piece having a light transmission of not less than 90% over the entire region was graded "good" (acceptable), and one having a lower transmission "bad".

(7) Pencil Scratch Hardness

Measured in accordance with JIS K5400. Hardness of H or higher was graded "good", and F or lower "bad".

(8) Shrinkage Percentage on Curing

Each ionizing radiation-curable resin composition was put into a stainless steel-made pan having an inner diameter of 30 mm and a height of 10 mm to a height of about 5 mm and irradiated with 1000 mJ/cm² of ultraviolet rays emitted from a conveyor type ultraviolet irradiation equipment using a medium pressure mercury lamp (80 W/cm) in air to prepare a cured test piece for measurement of specific gravity.

The specific gravity of the solid test piece (DS) was measured at 23°±2° C. in accordance with JIS K7112 B. Distilled water was used as an immersion liquid. The specific gravity of the liquid resin composition (DL) was measured at 23°±2° C., and a shrinkage percentage on curing was calculated according to the following equation. An average of two measurements of 5.5% or lower was graded "good", and an average higher than 5.5% "bad".

Shrinkage Percentage (%)=(DS−DL)/DS×100

(9) Curl

A sheet of A4 size was cut out of the prepared lens array sheet and placed on a horizontal plane with its lens side up, and the height (mm) of the edge of the spontaneously curled sheet from the horizontal plane was measured. A height of curl of 1 mm or less was graded "good", and a height of curl greater than that "bad".

(10) Initial Adhesion

Adhesion between a transparent PET base sheet and a cured resin layer constituting an optical sheet layer was measured in accordance with JIS K5400. A test piece retaining 95 or more out of 100 squares of the resin layer after a peel test was graded "good", and one having less adhesion "bad".

(11) Curability

A curable resin composition was irradiated by means of a medium pressure mercury lamp (160 W/cm) placed 15 cm above at a line speed of 10 m/min. The number of times of irradiation required for making the resin surface tack free was measured. The smaller the number of times of irradiation, the higher the curability. A resin composition which became tack free by irradiating twice was graded "good", and one requiring more times of irradiation "bad".

(12) Releasability

After ultraviolet curing, when a cured resin layer was released from the intaglio printing roll together with a PET film to obtain a continuous lens array sheet on which a desired pattern of the printing roll had been transferred, a sheet requiring no great load for release from the roll was graded "good". On the other hand, a sheet which made a great sound of release or suffered a great load to leave a trace of bending was graded "bad".

(13) Initial Appearance

The appearance of an optical sheet was observed with the naked eye immediately after the preparation and evaluated according to the following standards:

Good . . . The lens surface was uniform.

Medium . . . Part of the lens surface suffered cracks or drop-outs.

Bad . . . Cracks or drop-outs of lens shape were observed on the entire surface of the sheet.

(14) Adhesion after Immersion in Boiling Water

A prepared optical lens sheet was immersed in boiling water at 95° C. or higher for 4 hours and taken out into a room temperature atmosphere. After 2 hours, the adhesion was evaluated by a peel test in accordance with JIS K5400. "100/100" indicates all the square pieces remained, and "0/100" indicates all the square pieces were peeled off.

(15) Appearance after Immersion in Boiling Water

A prepared optical lens sheet was immersed in boiling water at 95° C. or higher for 4 hours and taken out into a room temperature atmosphere. The condition of the cured resin layer was observed with the naked eye.

(16) Adhesion in Accelerated Weathering Test

A prepared optical lens sheet was subjected to accelerated weathering with a fadeometer manufactured by Suga Shikenki K.K. (black panel temperature: 63°±3° C.) for 400 hours, and the adhesion of the cured resin layer was measured in accordance with JIS K5400.

Abbreviations of the resins used in Examples and Comparative Examples have the following meanings:

BBA: Tetrabromobisphenol A diglycidyl ether diacrylate
BBF: Tetrabromobisphenol F diglycidyl ether diacrylate
BA: Bisphenol A diglycidyl ether diacrylate
BF: Bisphenol F diglycidyl ether diacrylate
HBA: 2,2-Bis(4-hydroxycyclohexyl)propane diglycidyl ether diacrylate
PIPA: 2-Phenyl-2-(4-acryloyloxyethoxyphenyl)propane
BPOA: 2,4,6-Tribromophenyl acrylate
BPOEA: 2,4,6-Tribromophenoxyethyl acrylate
IBA: Isobornyl acrylate
THFA: Tetrahydrofurfuryl acrylate
GCMA: Glycidyl cyclocarbonate methacrylate
PGA: 2-Hydroxy-3-phenoxypropyl acrylate
184: 1-Hydroxycyclohexyl phenyl ketone
d1173: 2-Hydroxy-2-methyl-1-phenylpropan-1-one Units of the measurements given in the tables, methods of measurement, and meanings of the symbols used in the tables are shown below:

Viscosity: cps/25° C.
DB Concentration: Acrylate functional group concentration in the resin composition; mmol/g
D1: Refractive index of liquid (25° C.)
D2: Refractive index of solid (25° C.)
Tensile Strength: kg/cm²
Tensile Elongation: %
Tensile Modulus: kg/cm²
σ2/σ1: Evaluation of elasticity SS: Evaluation of the pattern of stress-strain curve
Light Transmission: Evaluation of transparency in terms of total light transmission
Hardness: Evaluation by measurement of pencil scratch hardness (7)
Shrinkage on Curing: Evaluation by measurement of shrinkage percentage on curing (8)
Curl: Evaluation by measurement of curl height (9)
Adhesion: Evaluation by measurement of initial adhesion (10)
Curability: Evaluation in terms of curability (11)

(a): Epoxyacrylate having a cyclic structure and two or more acrylate groups (b): Monofunctional acrylate having a cyclic structure (c): Photo initiator

TABLE 3

|  | Comparative Example 1 | Comparative Example 2 |
|---|---|---|
| Composition: |  |  |
| RSH-1 | 100 | — |
| RSH-2 | — | 100 |
| #184 | 3 | 3 |
| Evaluation Results: |  |  |
| Viscosity | $3 \times 10^5$ | 520 |
| DB Concentration | 1.6 | 3.1 |
| D1 | 1.4996 | 1.4633 |
| D2 | 1.5156 | 1.4848 |

TABLE 1

| | Resin | Example No. | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| (a) | BBA | 32 | — | — | — | — | — | — | — | — | — | — | — |
| | BBF | — | 35 | — | — | — | — | — | — | — | — | — | — |
| | BA | — | — | 55 | — | — | 50 | 70 | 80 | 70 | 65 | — | — |
| | BF | — | — | — | 50 | — | — | — | — | — | — | — | — |
| | HBA | — | — | — | — | 40 | — | — | — | — | — | — | — |
| (b) | PIPA | 18 | 15 | — | — | — | 50 | — | — | — | — | — | — |
| | BPOA | — | — | — | 50 | — | — | — | — | — | — | — | — |
| | BPOEA | 50 | 50 | 45 | — | 60 | — | — | — | — | — | — | — |
| | IBA | — | — | — | — | — | — | 30 | — | — | — | — | — |
| | THFA | — | — | — | — | — | — | — | 20 | — | 5 | — | — |
| | GCMA | — | — | — | — | — | — | — | — | 30 | — | — | — |
| | PGA | — | — | — | — | — | — | — | — | — | 30 | — | — |
| Synthetic Examples | S-1 | — | — | — | — | — | — | — | — | — | — | 100 | — |
| | SH-1 | — | — | — | — | — | — | — | — | — | — | — | 100 |
| (c) | #184 | 3 | 3 | 3 | 3 | 3 | — | — | — | — | — | 3 | 3 |
| | d1173 | — | — | — | — | — | 3 | 3 | 3 | 3 | 3 | — | — |

TABLE 2

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Viscosity | 4900 | 5850 | 8000 | 4200 | 5500 | 8700 | 9200 | 8300 | 11000 | 11500 | 4500 | 5600 |
| DB Concentration | 2.4 | 2.4 | 3.2 | 3.3 | 2.8 | 3.6 | 4.3 | 4.5 | 4.4 | 4.2 | 3.3 | 3.3 |
| D1 | 1.586 | 1.587 | 1.574 | 1.576 | 1.546 | 1.558 | 1.532 | 1.538 | 1.532 | 1.541 | 1.486 | 1.49 |
| D2 | 1.611 | 1.612 | 1.596 | 1.597 | 1.57 | 1.579 | 1.551 | 1.561 | 1.556 | 1.567 | 1.501 | 1.503 |
| Tensile Strength | 750 | 800 | 650 | 570 | 520 | 450 | 520 | 610 | 650 | 650 | 260 | 310 |
| Tensile Elongation | 3.8 | 4.2 | 3.8 | 2.5 | 3.8 | 2.7 | 2.5 | 3.9 | 2.1 | 3.5 | 78 | 71 |
| Tensile Modulus | 22000 | 21500 | 20600 | 23000 | 21200 | 18300 | 23500 | 19950 | 27000 | 22500 | 183 | 213 |
| σ2/σ1 | 0.90 | 0.89 | 0.83 | 0.99 | 0.65 | 0.91 | 0.89 | 0.78 | 1.01 | 0.83 | 1.82 | 2.05 |
| Yield Point | good | good | good | good | good | good | good | good | good | good | good | good |
| SS | A | A | A | A | A | A | A | A | A | A | A | A |
| Permanent Set | good | good | good | good | good | good | good | good | good | good | good | good |
| Light Transmission | good | good | good | good | good | good | good | good | good | good | good | good |
| Hardness | good | good | good | good | good | good | good | good | good | good | bad | bad |
| Shrinkage on Curing | good | good | good | good | good | good | good | good | good | good | good | good |
| Curl | good | good | good | good | good | good | good | good | good | good | good | good |
| Adhesion | good | good | good | good | good | good | good | good | good | good | good | good |
| Curability | good | good | good | good | good | good | good | good | good | good | good | good |

TABLE 3-continued

|  | Comparative Example 1 | Comparative Example 2 |
| --- | --- | --- |
| Tensile Strength | 580 | 120 |
| Tensile Elongation | 82 | 11 |
| Tensile Modulus | 2663 | 3600 |
| σ2/σ2 | 0.27 | 0.3 |
| Yield Point | bad | bad |
| SS | B | B |
| Permanent Set | bad | bad |
| Light Transmission | good | good |
| Hardness | bad | bad |
| Shrinkage on Curing | good | good |
| Curl | good | bad |
| Adhesion | good | good |
| Curability | bad | bad |

TABLE 4

|  | Example 13 | Example 14 | Compara. Example 1 | Compara. Example 2 |
| --- | --- | --- | --- | --- |
| Releasability | good | good | bad | good |
| Initial Appearance | good | good | good | medium |
| Adhesion after Immersion in Boiling Water | 100/100 | 100/100 | 80/100 | 0/100 |
| Appearance after Immersion in Boiling Water | good | good | bad | good |
| Adhesion after Accelerated Weathering | 100/100 | 100/100 | 70/100 | 0/100 |

Figure 13:
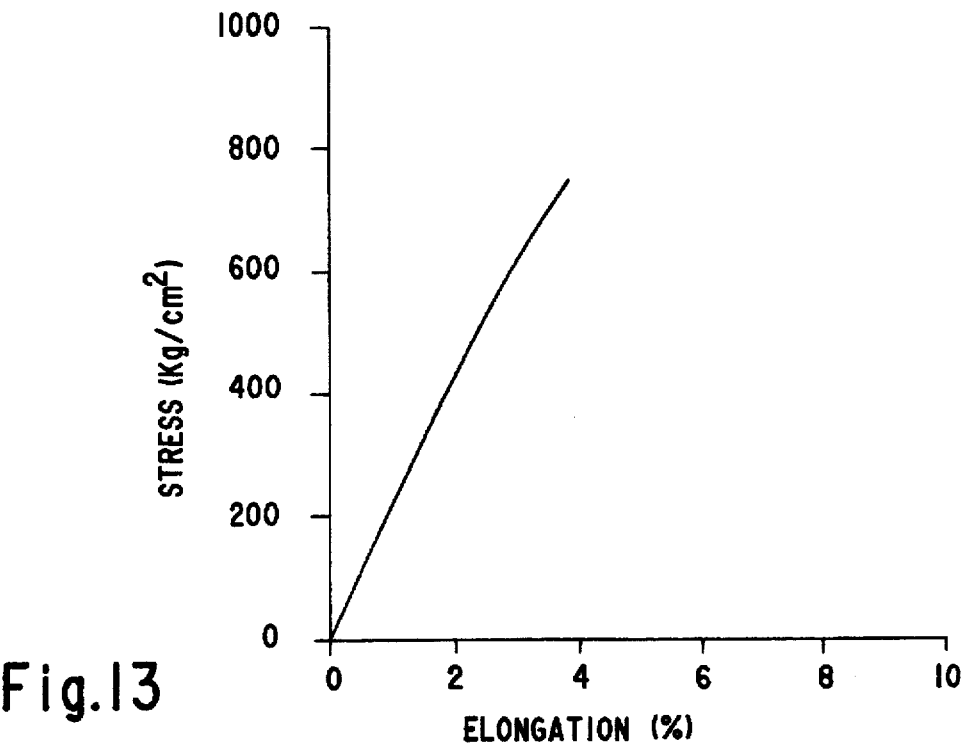
FIG. 13 is a diagram showing the relationship of tensile stress (kg/cm$^2$) vs. strain (%) of the cured resin composition obtained in Example 1.
Figure 14:
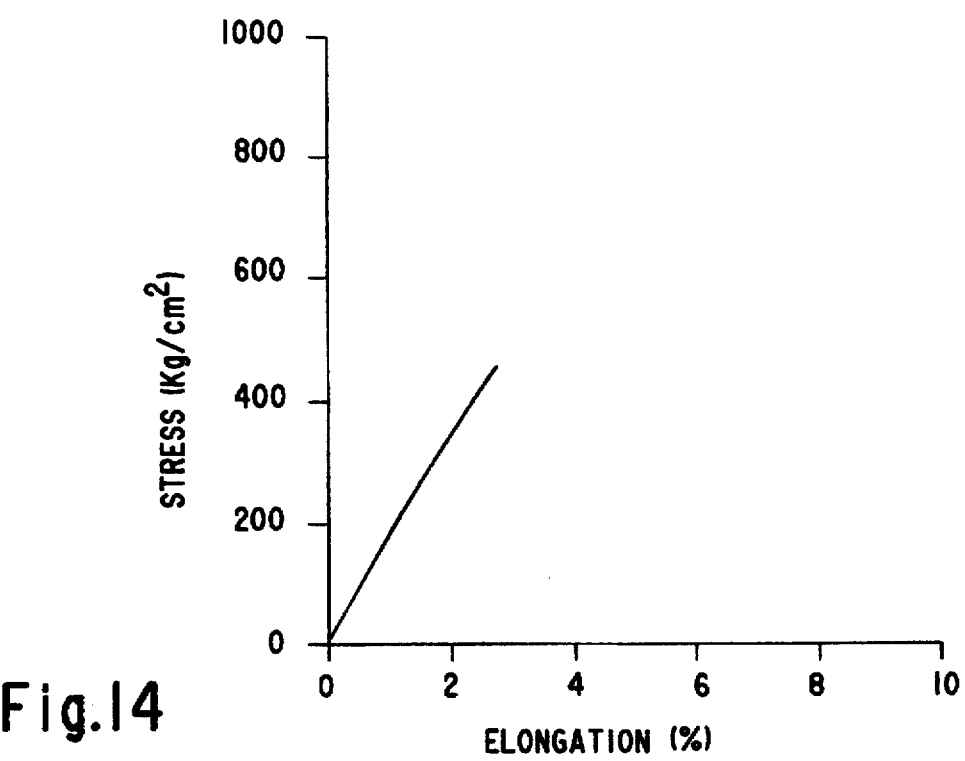
FIG. 14 is a diagram showing the relationship of tensile stress (kg/cm$^2$) vs. strain (%) of the cured resin composition obtained in Example 6.
Figure 15:
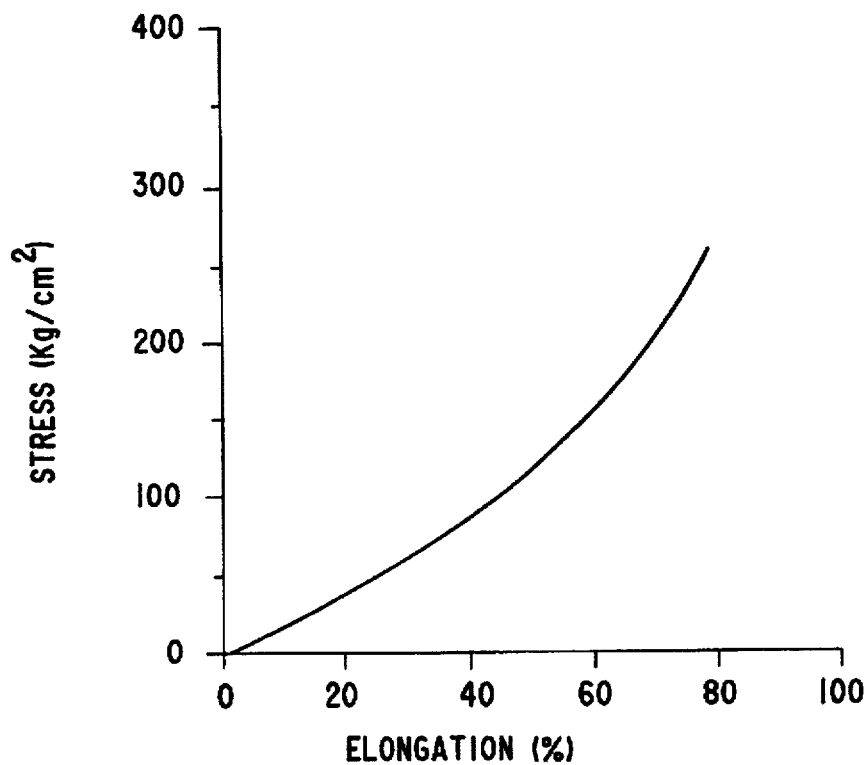
FIG. 15 is a diagram showing the relationship of tensile stress (kg/cm$^2$) vs. strain (%) of the cured resin composition obtained in Example 11.
Figure 16:
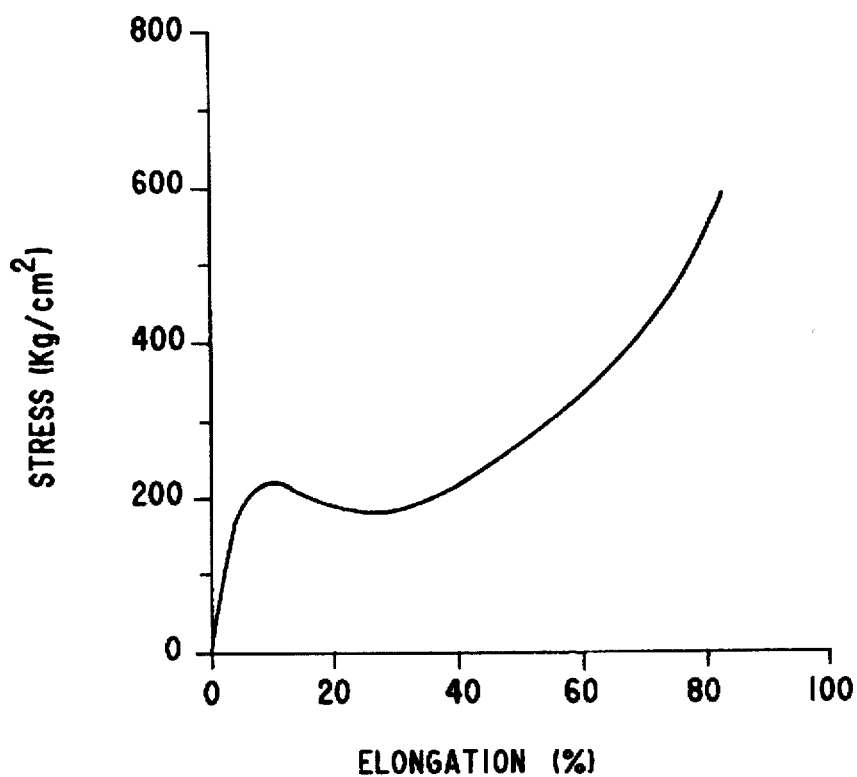
FIG. 16 is a diagram showing the relationship of tensile stress (kg/cm$^2$) vs. strain (%) of the cured resin composition obtained in Comparative Example 1.

FIGS. 13, 14, and 15 each are a diagram depicting the relationship of tensile stress (kg/cm$^2$) and strain (%) of the cured resin composition prepared in Examples 1, 6, and 11, respectively. These diagrams are given as typical examples of the stress-strain curves obtained in Examples. The stress-strain curves obtained in all Examples exhibited no yield point. FIG. 16 is a diagram illustrating the relationship of tensile stress (kg/cm$^2$) and strain (%) of the cured resin composition prepared in Comparative Example 1, in which an obvious yield point is observed. While the values of σ2 and σ1 are not specified in these diagrams, the ratio of measured values σ2/σ1 are shown in Tables.

EXAMPLE 15

Preparation of Surface Light Source

An edge light type surface light source having the structure shown in FIG. 11 was prepared using each of the lens array sheets obtained in Examples 1 to 10, and performance properties as a surface light source were evaluated.

Light Conducting Plate

A transparent acrylic resin plate having a thickness of 4 mm and a diagonal length of 9.4 in.

Light Reflecting Layer

A dot pattern was printed on the back side of the light conducting plate using a white ink (using a titanium oxide pigment), and an aluminum-deposited PET film was laminated on the printed pattern to form a mirror surface reflecting layer. The dot pattern had an increasing area ratio with the distance from a light source. Because a light source was provided on both side edges, the area ratio of the dot pattern reached the maximum at the center. Light Source:

A fluorescent tube of cold cathode gas discharge type having a diameter of 3 mm (power consumption: 4 W) was set by each of opposing side edges of the light conducting plate, and a reflecting mirror was provided to cover the circumference of each fluorescent tube except the side facing the light conducting plate.

Light Diffusing Transparent Sheet

Two sandblasted PET sheets each having a thickness of 38 mm were laid one on the other to form a light diffusing transparent sheet.

The luminance of the resulting surface light source was measured with a luminance meter "Topcon BM-8" placed 30 cm away from the light emitting side (the surface of the lens array sheet) within an angle range of from −90° to +90° with respect to the normal of the light emitting side (zero angle) to determine a normal luminance and angle dependency of luminance (light distribution characteristics and half value angle). Further, the lens array sheet of the surface light source was observed with the naked eye to see whether any trace of deformation was perceived as a distribution or a change of luminance.

As a result of measurement, it was revealed that every surface light source prepared had a normal luminance of not less than 1200 cd/cm$^2$ (varying from 1200 to 1250 cd/cm$^2$) and a half value angle of not less than 65° (varying from 65° to 75°) and showed no change in luminance due to a permanent set. Thus, a satisfactory surface light source was prepared.

The present invention provides an excellent ionizing radiation-curable resin composition, an excellent optical article comprising a cured product of the resin composition, and an excellent surface light source using the optical article, which have high surface hardness and a high refractive index and are free from deformation, permanent sets, and reduction in weather resistance after curing.

What is claimed is:

1. An ionizing radiation-curable resin composition for an optical article, wherein a cured product obtained therefrom has no yield point in the stress-strain diagram in tension.

2. An ionizing radiation-curable resin composition for an optical article according to claim 1, comprising (a) an epoxyacrylate having a cyclic structure and containing at least two acrylate groups and (b) a monofunctional acrylate having a cyclic structure and having a total acrylate functional group concentration of 0.2 to 5.0 mmol/g.

3. An ionizing radiation-curable resin composition for an optical article according to claim 2, wherein said epoxyacrylate (a) having a cyclic structure and containing at least two acrylate groups is an epoxyacrylate obtained by the reaction between (i) at least one epoxy resin selected from the group consisting of a bisphenol A epoxy resin, a bisphenol F epoxy resin, a partially halogen-substituted bisphenol A epoxy resin, a partially halogen-substituted bisphenol F epoxy resin, a hydrogenated bisphenol A epoxy resin and a mixture thereof, and (ii) (meth)acrylic acid.

4. An ionizing radiation-curable resin composition for an optical article according to claim 2 or 3, wherein said monofunctional acrylate (b) having a cyclic structure is at least one monofunctional acrylate selected from the group consisting of isobornyl (meth)acrylate, glycidyl cyclocarbonate (meth)acrylate, tetrahydrofurfuryl (meth)acrylate, 2-hydroxy-3-phenoxypropyl (meth)acrylate, 2-phenyl-2-(4-acryloyloxyphenyl)propane, a 2-phenyl-2-(4-acryloyloxyalkoxyphenyl)propane, 2,4,6-tribromophenyl acrylate, a 2,4,6-tribromophenoxyalkyl acrylate, and a mixture thereof.

5. An optical article comprising a cured product of an ionizing radiation-curable resin composition for an optical article according to any one of claims 1 to 3.

6. An optical article comprising (A) a layer of a cured product of an ionizing radiation-curable resin composition for an optical article according to any one of claims 1 to 3 and (C) a transparent resin layer having a sheet form.

7. An optical article comprising (A) a layer of a cured product of an ionizing radiation-curable resin composition for an optical article according to any one of claims 1 to 3, (B) an adhesive layer, and (C) a transparent resin layer having a sheet form.

8. A surface light source composed of a light conducting plate comprising a light transmitting plate, at least one light source unit adjoining one of side edges of said light conducting plate, a light reflecting layer provided on the back side of said light conducting plate, and an optical article according to claim 5 which is laminated on the light emitting side of said light conducting plate.

* * * * *